(12) United States Patent
Kobayashi et al.

(10) Patent No.: US 9,071,813 B2
(45) Date of Patent: *Jun. 30, 2015

(54) IMAGING APPARATUS, IMAGING METHOD, RECORDING MEDIUM, AND PROGRAM

(71) Applicant: Sony Corporation, Minato-ku (JP)

(72) Inventors: Seiji Kobayashi, Tokyo (JP); Isao Ohashi, Kanagawa (JP); Yoshihiko Kuroki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/177,927

(22) Filed: Feb. 11, 2014

(65) Prior Publication Data
US 2014/0161424 A1 Jun. 12, 2014

Related U.S. Application Data

(63) Continuation of application No. 12/663,538, filed as application No. PCT/JP2008/061835 on Jun. 30, 2008, now Pat. No. 8,687,079.

(30) Foreign Application Priority Data

Jun. 29, 2007 (JP) .................................. 2007-171672

(51) Int. Cl.
*H04N 5/77* (2006.01)
*H04N 9/79* (2006.01)
(Continued)

(52) U.S. Cl.
CPC . *H04N 9/79* (2013.01); *H04N 5/77* (2013.01); *H04N 7/0127* (2013.01); *H04N 7/12* (2013.01)

(58) Field of Classification Search
CPC .................................................. H04N 9/045

USPC ....................................................... 348/222.1
See application file for complete search history.

(56) References Cited

U.S. PATENT DOCUMENTS 4,677,464 A 6/1987 Vamaji et al.
6,526,098 B1 2/2003 Kato et al.
(Continued)

FOREIGN PATENT DOCUMENTS

EP 1 596 585 A2 11/2010
EP 1 596 585 A3 11/2010
(Continued)

OTHER PUBLICATIONS

Supplementary European Search Report issued Oct. 1, 2010, in Application No. 08790748.1-2202/2164257.

*Primary Examiner* — James Hannett
(74) *Attorney, Agent, or Firm* — Oblon, McClelland, Maier & Neustadt, L.L.P.

(57) ABSTRACT

Disclosed herein are an imaging apparatus, an imaging method, a recording medium, and a program which are capable of processing imaging data in a manner similar to that of a normal frame rate. Image data captured by a solid-state imaging element capable of performing imaging at a high resolution and a high frame rate is supplied to a memory control. The memory control, at the same time as writing the imaging data input from the imaging element in a frame memory, reads preceding frames of imaging data that are recorded on the frame memory, and sequentially respectively outputs them in parallel, as video image data items, for each frame, to respective camera signal processing units. In the camera signal processing units, a video output, a viewfinder output, codec units, and recording units, processing similar to that when a frame rate that is ¼ the imaging frame rate is executed.

23 Claims, 16 Drawing Sheets

(51) Int. Cl.
*H04N 7/01* (2006.01)
*H04N 7/12* (2006.01)

(56) References Cited

U.S. PATENT DOCUMENTS

| | | | |
|---|---|---|---|
| 6,614,846 B1* | 9/2003 | Fujiwara et al. | 375/240.16 |
| 6,784,940 B1 | 8/2004 | Takazawa et al. | |
| 8,687,079 B2* | 4/2014 | Kobayashi et al. | 348/222.1 |
| 2005/0128217 A1* | 6/2005 | Cohen | 345/603 |
| 2007/0086528 A1 | 4/2007 | Mauchly et al. | |
| 2008/0049121 A1 | 2/2008 | Tsujimura et al. | |

FOREIGN PATENT DOCUMENTS

| | | |
|---|---|---|
| JP | 59-230387 | 12/1984 |
| JP | 63-128881 | 6/1988 |
| JP | 1-286586 | 11/1989 |
| JP | 5-128411 | 5/1993 |
| JP | 5-316402 | 11/1993 |
| JP | 8-88833 | 4/1996 |
| JP | 10-271433 | 10/1998 |
| JP | 2000-188703 | 7/2000 |
| JP | 2006-319513 | 11/2006 |

\* cited by examiner

FIG. 2

| $R_{11}$ | $G_{12}$ | $R_{13}$ | $G_{14}$ |
|---|---|---|---|
| $G_{21}$ | $B_{22}$ | $G_{23}$ | $B_{24}$ |
| $R_{31}$ | $G_{32}$ | $R_{33}$ | $G_{34}$ |
| $G_{41}$ | $B_{42}$ | $G_{43}$ | $B_{44}$ |

IMAGING APPARATUS, IMAGING METHOD, RECORDING MEDIUM, AND PROGRAM

CROSS REFERENCE TO RELATED APPLICATIONS

This document is a Continuation application of, is based upon and claims the benefit of Priority under 35 §U.S.C. 119 from U.S. Ser. No. 12/663,538, filed Dec. 8, 2009, herein incorporated by reference, which is a National Stage application of International Application No. PCT/JP2008/061835, filed Jun. 30, 2008, which is based upon and claims the benefit of priority form prior Japanese Patent Application No. 2007-171672, filed Jun. 29, 2007.

TECHNICAL FIELD

The present invention relates to an imaging apparatus, an imaging method, a recording medium, and a program. More specifically, the present invention relates to an imaging apparatus, an imaging method, a recording medium, and a program which are suitable for use in capturing a moving image at a high frame rate.

BACKGROUND ART

In recent years, high-speed imaging apparatuses capable of performing imaging at a speed higher than a normal video frame rate (60 frames per second, 50 frames per second, 24 frames per second, or the like) have become widely used.

For realization of imaging and recording at a high frame rate, for example, high-speed imaging apparatuses capable of realizing high-speed imaging with a reduced number of pixels that are read from solid-state imaging elements within one frame without increasing the speed of the subsequent processing have been available. Such high-speed imaging apparatuses employ a technique for recording a plurality of frame images with a reduced number of images within one frame of a standard video signal in such a manner that the plurality of frame images are joined together (see, for example, Patent Document 1) or a technique for performing recording onto a semiconductor memory using a dedicated compression scheme or image format (see, for example, Patent Document 2).

[Patent Document 1] Japanese Unexamined Patent Application Publication No. 8-88833

[Patent Document 2] Japanese Unexamined Patent Application Publication No. 2006-319513

Additionally, high-speed imaging apparatuses in which imaging data output by driving a solid-state imaging element at a high speed is recorded directly onto a semiconductor memory to realize high-speed imaging have been available. In many of such high-speed imaging apparatuses, since imaging data is output from a solid-state imaging element at a speed that is too high to perform subsequent signal processing, uncompressed RAW data is recorded without any change. Such high-speed imaging apparatuses have been commercially available mainly for industrial inspection.

Then, additionally, high-speed imaging apparatuses that realize high-speed imaging by spatially dividing an image of one frame and processing individual areas in parallel have been available. Such high-speed imaging apparatuses employ a technique for distributing an output from a solid-state imaging element in units of horizontal lines and performing parallel processing (see, for example, Patent Document 3) or a technique for splitting incident light using a prism, supplying resulting light components to a plurality of solid-state imaging elements, and processing output signals of these solid-state imaging elements in parallel (see, for example, Patent Document 4).

[Patent Document 3] Japanese Unexamined Patent Application Publication No. 1-286586

[Patent Document 4] Japanese Unexamined Patent Application Publication No. 5-316402

DISCLOSURE OF INVENTION

Technical Problem

However, in a case where the number of pixels read from a solid-state imaging element is reduced, it is not possible to obtain a high spatial resolution. Additionally, recording of an image in which a plurality of frames are bonded to one another requires image conversion processing during reproduction, resulting in increased complexity of the processing.

Additionally, in a case where imaging data output by driving a solid-state imaging element at a high speed is recorded directly onto a semiconductor memory to realize high-speed imaging, it is possible to achieve imaging at a high resolution and a high frame rate although imaging data is output from the solid-state imaging element at a speed that is so high as to require the use of a semiconductor memory as a recording device. However, due to a limit in the capacity of a semiconductor memory that can be mounted in an imaging apparatus, long-time recording is difficult.

Additionally, if an image is spatially divided into segments and the segments are processed in parallel in order to perform image processing at a high speed, it is possible to record a high-resolution and high-frame-rate image for a long time. However, since each recorded image data segment is an image divided horizontally or vertically in the shape of a strip or the shape of a rectangular area, it is necessary to perform a process of combining these images during reproduction, resulting in increased complexity of the processing. Additionally, since each recorded image segment is a recorded spatial portion of an actual frame, it has been meaningless to individually reproduce the respective recorded image segments. In other words, each recorded image data segment has been data that cannot be utilized as it is.

The present invention has been made in view of such situations, and is intended to facilitate easy processing of an image captured at a high resolution and a high frame rate.

Technical Solution

An imaging apparatus of an aspect of the present invention includes imaging means for obtaining imaging data of a first rate; data dividing means for distributing the imaging data of the first rate, which is captured by the imaging means, in units of frames and dividing the imaging data into N channels of moving image data of a second rate that is a rate that is 1/N the first rate (where N is a positive integer); and N image processing means for processing in parallel the N channels of moving image data obtained by the dividing means.

The imaging apparatus can be configured to further include output means for outputting the N channels of moving image data processed by the image processing means, and the output means can be configured to output only one channel of the N channels of moving image data or to output a result obtained by performing frame combination on at least a portion of the N channels of moving image data on the basis of a rate of moving image data to be output.

The imaging apparatus can be configured to further include recording means for recording the N channels of moving image data processed by the image processing means, and the output means can be configured to output at least a portion of the N channels of the moving image data recorded on the recording means.

The recording means can be configured such that N recording means are provided or the recording means is divided into N areas, and can be configured to respectively record the N channels of moving image data processed by the image processing means.

The second rate can be configured to be 60 frames per second.

The second rate can be configured to be 50 frames per second.

The second rate can be configured to be 24 frames per second.

The N channels can be configured to be four channels.

The N channels can be configured to be two channels.

The first rate can be configured to be 240 frames per second.

The imaging apparatus can be configured to further include recording means for recording the N channels of moving image data processed by the image processing means.

The recording means can be configured such that N recording means are provided or the recording means is divided into N areas, and can be configured to respectively record the N channels of moving image data processed by the image processing means.

The imaging apparatus can be configured to further include encoding means for encoding the N channels of moving image data processed by the image processing means, and the recording means can be configured to record the N channels of moving image data encoded by the encoding means.

The imaging apparatus can be configured to further include decoding means for decoding the N channels of moving image data encoded by the encoding means and recorded by the recording means; and output means for outputting the N channels of moving image data decoded by the decoding means. The decoding means can be configured to decode only one channel of the N channels of moving image data or to decode at least a portion of the N channels of moving image data on the basis of a rate of moving image data to be output. The output means can be configured to output the one channel of the N channels of moving image data, which is decoded by the decoding means, or to output a result obtained by performing frame combination on at least a portion of the N channels of moving image data on the basis of a rate of moving image data to be output.

An imaging method of an aspect of the present invention is an imaging method for an imaging apparatus that captures moving image data, and includes the steps of performing imaging at a first rate; dividing captured imaging data of the first rate in units of frames into N channels of moving image data of a second rate that is a rate that is 1/N the first rate (where N is a positive integer); and processing the obtained N channels of moving image data using N parallel units.

A program of an aspect of the present invention is a program for causing a computer to execute a process of capturing moving image data, and causes the computer to execute a process including the steps of controlling imaging at a first rate; dividing captured imaging data of the first rate in units of frames into N channels of moving image data of a second rate that is a rate that is 1/N the first rate (where N is a positive integer); and processing the obtained N channels of moving image data using N parallel units.

In an aspect of the present invention, an image is captured at a first rate, captured imaging data of the first rate is divided in units of frames into N channels of moving image data of a second rate that is a rate that is 1/N the first rate (where N is a positive integer), and the obtained N channels of moving image data are processed using N parallel units.

The term network refers to a mechanism in which at least two apparatuses are connected to each other so that information can be transmitted from one apparatus to another apparatus. Apparatuses that communicate with one another via a network may be independent apparatuses or internal blocks that constitute a single apparatus.

Additionally, the term communication refers to communication which may include, as well as wireless communication and wired communication, communication including both wireless communication and wired communication, that is, communication where wireless communication is performed in a certain period while wired communication is performed in another period. Furthermore, communication from one apparatus to another apparatus may be performed via wired communication, and communication from the other apparatus to the one apparatus may be performed via wireless communication.

An imaging apparatus may be an independent apparatus or may be a block that performs imaging processing, which is provided in an image processing apparatus, an information processing apparatus, a recording/reproducing apparatus, or the like.

Advantageous Effects

As above, according to an aspect of the present invention, a moving image can be captured and, in particular, even during imaging at a high frame rate, an image can be processed in a manner similar to that during imaging at a normal frame rate.

BRIEF DESCRIPTION OF DRAWINGS

FIG. 2 is a diagram illustrating a Bayer pattern.

EXPLANATION OF REFERENCE NUMERALS

1 imaging apparatus, 11 camera control unit, 21 imaging optical system, 22 imaging element, 23 memory control unit, 24 frame memory, 25 camera signal processing unit, 26 video output unit, 27 viewfinder output unit, 28 codec unit, 29 recording unit, 51 WB correction unit, 52 RGB interpolation synchronization processing unit, 53 matrix processing unit, 54 γ correction unit, 55 color space conversion unit, 101 imaging apparatus, 120 dichroic prism, 121 to 123 imaging element, 124 memory control unit, 125 frame memory, 126 camera signal processing unit, 151 WB correction unit

BEST MODE FOR CARRYING OUT THE INVENTION

An embodiment of the present invention will be explained hereinafter with reference to the drawings.

Figure 1:
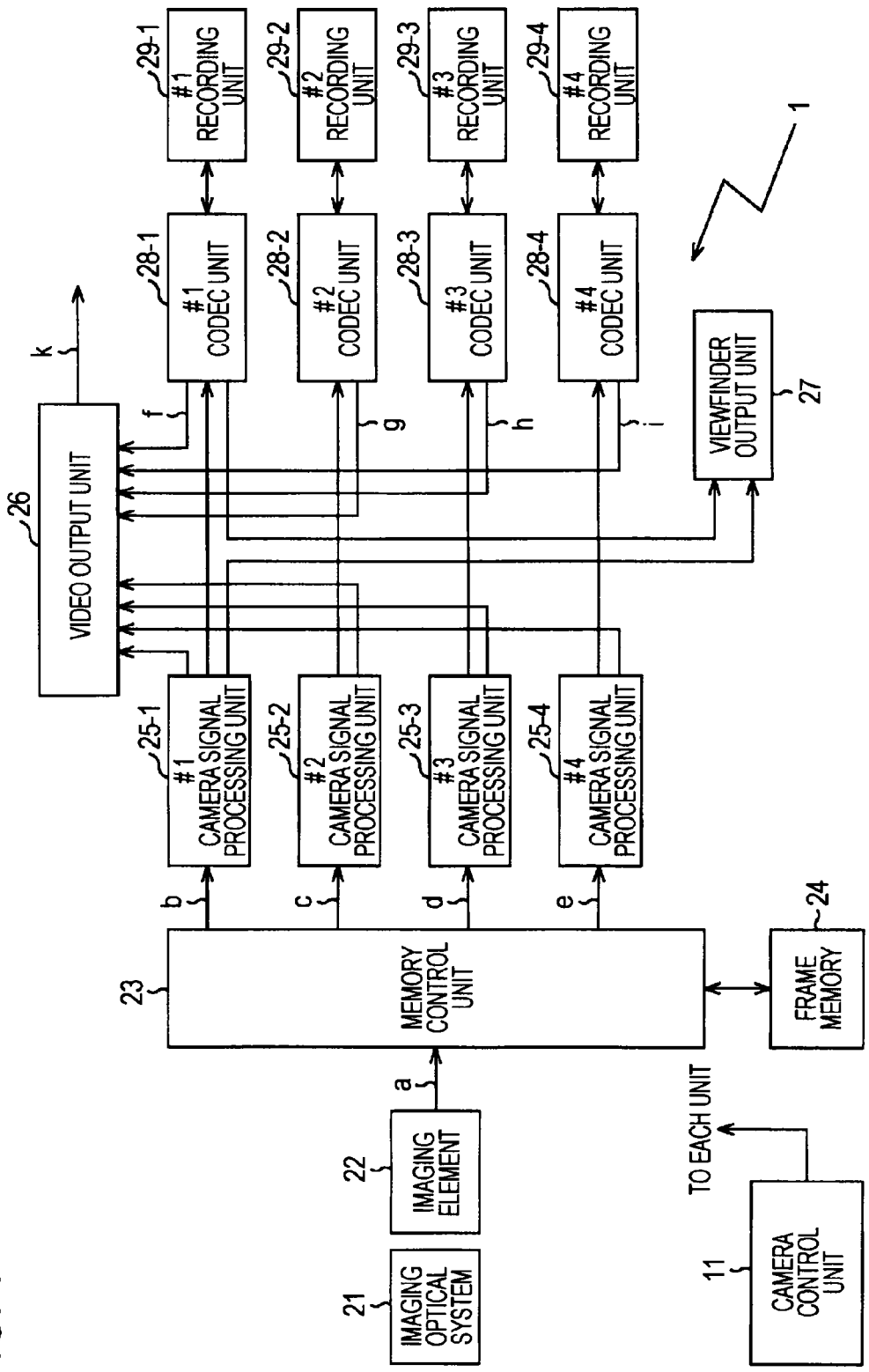
FIG. 1 is a block diagram illustrating a configuration of an imaging apparatus to which the present invention is applied.

FIG. 1 is a block diagram illustrating a configuration of an imaging apparatus 1 to which the present invention is applied.

The imaging apparatus 1 is configured to include a camera control unit 11, an imaging optical system 21, an imaging element 22, a memory control unit 23, a frame memory 24, a #1 camera signal processing unit 25-1, a #2 camera signal processing unit 25-2, a #3 camera signal processing unit 25-3, a #4 camera signal processing unit 25-4, a video output unit 26, a viewfinder output unit 27, a #1 codec unit 28-1, a #2 codec unit 28-2, a #3 codec unit 28-3, a #4 codec unit 28-4, a #1 recording unit 29-1, a #2 recording unit 29-2, a #3 recording unit 29-3, and a #4 recording unit 29-4.

The camera control unit 11 is designed to control the overall processing of the imaging apparatus 1.

The imaging apparatus 1 receives, using the imaging element 22, light incident through the imaging optical system 21 having a mechanical shutter, a lens, and the like. The imaging element 22 is a solid-state imaging element capable of performing imaging at a high resolution (here, for example, HD resolution) and a high frame rate (here, for example, 240 frames per second, that is, referred to as 240 Hz), and outputs imaging data that is digitally converted via an AD converter (not illustrated), that is, imaging element output data indicated by a in the figures. Here, the AD converter may be mounted on an element in a case where the imaging element 22 is a CMOS solid-state imaging element or any other case, or may be placed outside the imaging element 22 when the imaging element 22 is a solid-state imaging element other than a CMOS solid-state imaging element or any other occasion. Additionally, the imaging element 22 of the imaging apparatus 1 explained using FIG. 1 is a single-plate color solid-state imaging element having, on a light receiving surface, a color filter that transmits light in different wavelength ranges for individual pixels.

Since imaging data output from the imaging element 22 is so-called RAW data that is output from a single-plate color solid-state imaging element, the imaging data is configured by pixel data having a color pattern according to a Bayer pattern as illustrated in FIG. 2, and is supplied to the memory control unit 23. Then, in the memory control unit 23, a plurality of pixel data items are integrated into units of one block that can be exchanged with the frame memory 24 at a time (for example, a predetermined amount of data into which a plurality of pixel data items are integrated, such as 64 bits or 128 bits, one line of data, or the like), and are stored in the frame memory 24. The memory control unit 23, at the same time as writing the imaging data input from the imaging element 22 in the frame memory 24, reads preceding frames of imaging data from the frame memory 24, and simultaneously outputs, on a frame-by-frame basis, the imaging data as video image data items indicated by b to e in the figures to the #1 camera signal processing unit 25-1, the #2 camera signal processing unit 25-2, the #3 camera signal processing unit 25-3, and the #4 camera signal processing unit 25-4.

When the imaging data input from the imaging element 22 to the memory control unit 23, that is, imaging element output data indicated by a in the figures, is imaging data of HD resolution and 240 frames per second, the video image data items indicated by b to e in the figures, each of which is imaging data of HD resolution and 60 frames per second, are output to the #1 camera signal processing unit 25-1, the #2 camera signal processing unit 25-2, the #3 camera signal processing unit 25-3, and the #4 camera signal processing unit 25-4. Here, the frame memory 24 has a capacity to store at least eight frames of imaging data. The details of the operation of the memory control unit 23 will be described below with reference to FIGS. 3 and 4.

The #1 camera signal processing unit 25-1 acquires the imaging data (RAW data) of HD resolution and 60 frames per second, which is output from the memory control unit 23, performs signal processing, and outputs a signal-processed video signal to the #1 codec unit 28-1 and the viewfinder output unit 27. The #2 camera signal processing unit 25-2 acquires the imaging data of HD resolution and 60 frames per second, which is output from the memory control unit 23, performs signal processing, and outputs a signal-processed video signal to the #2 codec unit 28-2. The #3 camera signal processing unit 25-3 acquires the imaging data of HD resolution and 60 frames per second, which is output from the memory control unit 23, performs signal processing, and outputs a signal-processed video signal to the #3 codec unit 28-3. The #4 camera signal processing unit 25-4 acquires the imaging data of HD resolution and 60 frames per second, which is output from the memory control unit 23, performs signal processing, and outputs a signal-processed video signal to the #4 codec unit 28-4.

In the following explanation, each of the #1 camera signal processing unit 25-1, the #2 camera signal processing unit 25-2, the #3 camera signal processing unit 25-3, and the #4 camera signal processing unit 25-4 is referred to simply as a camera signal processing unit 25 unless they need to be individually identified. Since each of the camera signal processing units 25 processes general imaging data of 60 frames per second, the imaging apparatus 1 does not require the use of a high-speed signal processing unit having the capabilities to process imaging data of 240 frames per second. A further detailed configuration of the camera signal processing units 25 will be described below with reference to FIG. 5.

The #1 codec unit 28-1 acquires the video signal output from the #1 camera signal processing unit 25-1, and performs image encoding processing. The #2 codec unit 28-2 acquires the video signal output from the #2 camera signal processing unit 25-2, and performs image encoding processing. The #3 codec unit 28-3 acquires the video signal output from the #3 camera signal processing unit 25-3, and performs image encoding processing. The #4 codec unit 28-4 acquires the video signal output from the #4 camera signal processing unit 25-4, and performs image encoding processing.

The #1 codec unit 28-1 outputs an image-encoded image data stream to the #1 recording unit 29-1. The #2 codec unit 28-2 outputs an image-encoded image data stream to the #2 recording unit 29-2. The #3 codec unit 28-3 outputs an image-encoded image data stream to the #3 recording unit 29-3. The #4 codec unit 28-4 outputs an image-encoded image data stream to the #4 recording unit 29-4.

Further, the #1 codec unit 28-1 acquires a compression encoded image data stream from the #1 recording unit 29-1, decodes it, and outputs decoded video image data, which is indicated by f in the figures, to the video output unit 26. Similarly, the #1 codec unit 28-1 also outputs the decoded video image data to the viewfinder output unit 27. The #2 codec unit 28-2 acquires a compression encoded image data stream from the #2 recording unit 29-2, decodes it, and outputs decoded video image data, which is indicated by g in the figures, to the video output unit 26. The #3 codec unit 28-3 acquires a compression encoded image data stream from the #3 recording unit 29-3, decodes it, and outputs decoded video image data, which is indicated by h in the figures, to the video output unit 26. The #4 codec unit 28-4 acquires a compression encoded image data stream from the #4 recording unit 29-4, decodes it, and outputs decoded video image data, which is indicated by i in the figures, to the video output unit 26.

Here, the image encoding processing executed by the #1 codec unit 28-1, the #2 codec unit 28-2, the #3 codec unit 28-3, and the #4 codec unit 28-4 is implemented using JPEG 2000 CODEC for intra-frame compression, MPEG 2 or H.264 CODEC for inter-frame compression, or the like. In the following explanation, each of the #1 codec unit 28-1, the #2 codec unit 28-2, the #3 codec unit 28-3, and the #4 codec unit 28-4 is referred to simply as a codec unit 28 unless they need to be individually identified. Since each of the codec units 28 processes general data of 60 frames per second, the imaging apparatus 1 does not require the use of a high-speed codec unit having the capabilities to process data of 240 frames per second. Additionally, here, explanation has been given assuming that the codec units 28 are designed to perform encoding and decoding. However, it goes without saying that, in place of the codec units 28, decoders and encoders may be individually provided.

The #1 recording unit 29-1, the #2 recording unit 29-2, the #3 recording unit 29-3, and the #4 recording unit 29-4 acquire and record the compression encoded image data streams of 60 frames per second, which are respectively output from the codec units 28. That is, each of the #1 recording unit 29-1, the #2 recording unit 29-2, the #3 recording unit 29-3, and the #4 recording unit 29-4 records a compression encoded image data stream of a video signal of HD resolution and 60 frames per second.

In FIG. 1, each of the #1 recording unit 29-1, the #2 recording unit 29-2, the #3 recording unit 29-3, and the #4 recording unit 29-4 is described as an independent recording unit. However, the #1 recording unit 29-1, the #2 recording unit 29-2, the #3 recording unit 29-3, and the #4 recording unit 29-4 may be designed to represent different storage areas in a single recording unit. In the following explanation, each of the #1 recording unit 29-1, the #2 recording unit 29-2, the #3 recording unit 29-3, and the #4 recording unit 29-4 is referred to simply as a recording unit 29 unless they need to be individually identified. Each of the recording units 29 may be implemented using, for example, a drive in which a removable medium such as an optical disk is placed, a hard disk, a semiconductor memory, or the like.

The viewfinder output unit 27 receives the video signal output from the #1 camera signal processing unit 25-1 or the #1 codec unit 28-1, and converts the video signal into a signal that can be displayed on a viewfinder. The viewfinder, which is not illustrated, is a display unit on which an image that is being photographed or an image that is being reproduced and output is confirmed, and may be built in or provided outside the imaging apparatus 1. The viewfinder is configured by, for example, a liquid crystal display device that displays a video signal (YCbCr 4:2:2). The viewfinder often has a resolution lower than the normal HD resolution and, additionally, similarly, also has a low frame rate. Thus, the viewfinder output unit 27 performs resolution conversion processing in accordance with the resolution of the viewfinder or performs frame rate conversion processing. Furthermore, in a case where an input signal of the viewfinder is an RGB signal, the viewfinder output unit 27 may be configured to directly acquire a γ converted image signal, which has not been subjected to color space conversion processing by the #1 camera signal processing unit 25-1.

The video output unit 26 acquires signal-processed video signals from the camera signal processing units 25 or decoded reproduction image data from the codec units 28, and performs frame combination, as necessary, to generate a video signal of a predetermined frame rate. The video output unit 26 outputs the video signal of the predetermined frame rate as a video output indicated by k in the figures to, for example, an external recording device or display device, a predetermined signal transmission channel, or the like.

The details of frame combination for video image data to be output from the imaging apparatus 1 will be described below with reference to FIGS. 6 and 7.

Next, the relationship between a captured image in the imaging apparatus 1 and image frames to be processed and recorded will be explained with reference to FIG. 3.

Here, explanation will be given assuming that the imaging element 22 of the imaging apparatus 1 captures an image at HD resolution and 240 frame per second. Therefore, in FIG. 1, the imaging element output data indicated by a in the figures is such that 240 frames of image data of HD resolution are output per second in the time direction. FIG. 2 illustrates frame distribution in a case where 12 frames including the N-th frame to the (N+11)-th frame are output as the imaging element output data a from the imaging element 22.

As described above, the imaging element output data a is temporarily stored in the frame memory 24 by the memory control unit 23. At the timing of time t1 when the N-th frame is output from the imaging element 22, four frames of image data including the (N−4)-th to (N−1)-th frames are held in the frame memory 24 having a recording capacity of at least eight frames. For a period until time t2 when four frames of image data including the N-th frame, the (N+1)-th frame, the (N+2)-th frame, and the (N+3)-th frame, which are output from the imaging element 22, are sequentially supplied to and recorded on the frame memory 24, specifically, for a period of 4/240 seconds, the memory control unit 23 reads the four frames of image data including the (N−4)-th to (N−1)-th frames in parallel, which are stored in the frame memory 24, and distributes the (N−4)-th frame to the #1 camera signal processing unit 25-1, the (N−3)-th frame to the #2 camera signal processing unit 25-2, the (N−2)-th frame to the #3 camera signal processing unit 25-3, and the (N−1)-th frame to the #4 camera signal processing unit 25-4.

Then, at the timing of time t2 when the (N+4)-th frame is output from the imaging element 22, four frames of image data including the N-th to (N+3)-th frames are held in the frame memory 24. For a period until time t3 when four frames of image data including the (N+4)-th frame, the (N+5)-th frame, the (N+6)-th frame, and the (N+7)-th frame, which are output from the imaging element 22, are sequentially supplied to and recorded on the frame memory 24, specifically, for a period of 4/240 seconds, the memory control unit 23 reads the four frames of image data including the N-th to (N+3)-th frames in parallel, which are stored in the frame memory 24, and distributes the N-th frame to the #1 camera signal processing unit 25-1, the (N+1)-th frame to the #2 camera signal processing unit 25-2, the (N+2)-th frame to the #3 camera signal processing unit 25-3, and the (N+3)-th frame to the #4 camera signal processing unit 25-4.

Subsequently, at the timing of time t3 when the (N+8)-th frame is output from the imaging element 22, four frames of image data including the (N+4)-th to (N+7)-th frames are held in the frame memory 24. For a period until four frames of image data including the (N+8)-th frame, the (N+9)-th frame, the (N+10)-th frame, and the (N+11)-th frame, which are output from the imaging element 22, are sequentially supplied to and recorded on the frame memory 24, specifically, for a period of $4/240$ seconds, the memory control unit 23 reads the four frames of image data including the (N+4)-th to (N+7)-th frames in parallel, which are stored in the frame memory 24, and distributes the (N+4)-th frame to the #1 camera signal processing unit 25-1, the (N+5)-th frame to the #2 camera signal processing unit 25-2, the (N+6)-th frame to the #3 camera signal processing unit 25-3, and the (N+7)-th frame to the #4 camera signal processing unit 25-4.

That is, the imaging element output data a supplied from the imaging element 22 is read from the frame memory 24 with a delay of four frames, and is supplied to one of the camera signal processing units 25. Each of the video image data b to e read from the frame memory 24 has a frame rate that is ¼ that of the imaging element output data a. For example, when the imaging element output data a is image data of HD resolution and 240 frames per second, each of the video image data b to e is image data of HD resolution and 60 frames per second.

Next, the input/output timings of captured image frames in the imaging apparatus 1 and image frames to be processed and recorded will be explained with reference to FIG. 4.

The imaging element output data a illustrated in FIG. 1 includes, in addition to pixel data that constitutes each captured image frame, in correspondence with each frame, a vertical synchronization signal A that is a synchronization signal representing the top of each frame, a horizontal synchronization signal generated for each of horizontal lines constituting a frame, and an enable signal. Here, when the imaging element output data a has HD resolution and 240 frames per second, the vertical synchronization signal A is a signal that becomes active every $1/240$ seconds. The pixel data is a signal in which all pixel data items (for example, 2200 pixels by 1125 lines of pixels) are arranged in time series within one frame period ($1/240$ seconds) including a blanking period.

Then, the imaging element output data a is sequentially supplied to and stored in the frame memory 24. In parallel with this storage process, four frames of video image data, which have already been stored in the frame memory 24, are read in parallel, that is, alternately in predetermined read units. Each of the video image data b to e read in parallel is, as described above, image data of HD resolution and 60 frames per second. The read unit is determined on the basis of, for example, the amount of data that can be exchanged each time the frame memory 24 is accessed, and can be, for example, data of a predetermined number of bits, or one line or a plurality of predetermined lines of data within one frame of image.

A vertical synchronization signal B-1 that is a synchronization signal indicating the top of the video image data b supplied to the #1 camera signal processing unit 25-1 is a signal that becomes active every $1/60$ seconds. The pixel data that constitutes the video image data b is a signal in which all pixel data items (for example, 2200 pixels by 1125 lines of pixels) are arranged in time series within one frame period ($1/60$ seconds) including a blanking period.

Similarly to above, a vertical synchronization signal B-2 that is a synchronization signal indicating the top of the video image data c supplied to the #2 camera signal processing unit 25-2 is a signal that becomes active every $1/60$ seconds. The pixel data that constitutes the video image data c is a signal in which all pixel data items (for example, 2200 pixels by 1125 lines of pixels) are arranged in time series within one frame period ($1/60$ seconds) including a blanking period. Then, a vertical synchronization signal B-3 that is a synchronization signal indicating the top of the video image data d supplied to the #3 camera signal processing unit 25-3 is a signal that becomes active every $1/60$ seconds. The pixel data that constitutes the video image data d is a signal in which all pixel data items (for example, 2200 pixels by 1125 lines of pixels) are arranged in time series within one frame period ($1/60$ seconds) including a blanking period. Additionally, a vertical synchronization signal B-4 that is a synchronization signal indicating the top of the video image data e supplied to the #4 camera signal processing unit 25-4 is a signal that becomes active every $1/60$ seconds. The pixel data that constitutes the video image data e is a signal in which all pixel data items (for example, 2200 pixels by 1125 lines of pixels) are arranged in time series within one frame period ($1/60$ seconds) including a blanking period.

Each of the video image data b to e read from the frame memory 24 by the process of the memory control unit 23 can be independently processed or displayed as video image data of HD resolution and 60 frames per second, and is supplied to and processed in the corresponding one of the #1 camera signal processing unit 25-1, the #2 camera signal processing unit 25-2, the #3 camera signal processing unit 25-3, and the #4 camera signal processing unit 25-4.

Figure 5:
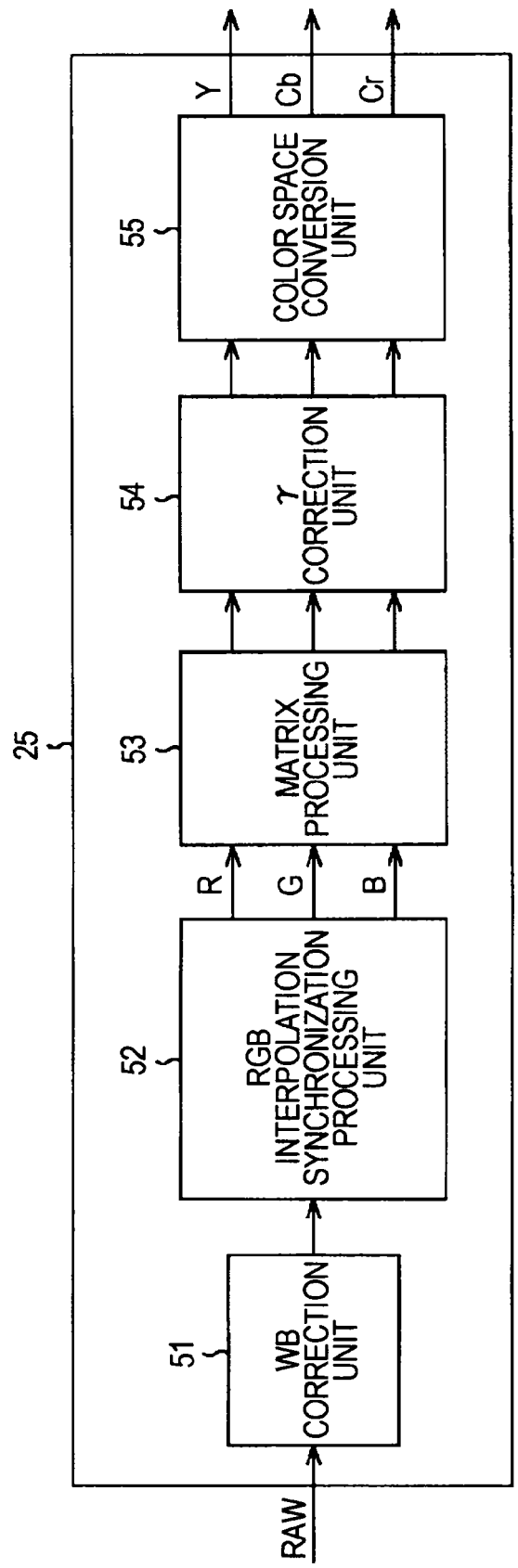
FIG. 5 is a block diagram illustrating a configuration of a camera signal processing unit of FIG. 1.

FIG. 5 is a block diagram illustrating a detailed configuration of the camera signal processing unit 25.

A WB (white balance) correction unit 51 corrects the balance of respective color components of RAW data, and performs white balance adjustment so as to make brightness values of the red component (R), the green component (G), and the blue component (B) equal to each other in an achromatic area.

An RGB interpolation synchronization processing unit 52 performs an interpolation process based on neighboring pixel data, that is, so-called demosaic processing, on RAW data having only one of the R, G, and B color components in each pixel, and outputs resulting data as pixel data having all the color components in each pixel. For example, in imaging data having the Bayer pattern illustrated in FIG. 2, a pixel $B_{22}$ at the pixel position (x=2, y=2) has only the B component. Thus, an interpolation process using neighboring pixels is performed to generate the R component and the G component which are output as $R_{22}$ and $G_{22}$, respectively. Similarity applies to a pixel in which only the R component exists as imaging data (for example, x=1, y=1) and a pixel in which only the G component exists (for example, x=2, y=1).

A matrix processing unit 53 is a color correction processing circuit using a 3 by 3 matrix. The process thereof allows the color balance that depends upon the color space of the imaging element and the photographic environment to approach a true color space compatible with the signal standard.

A gamma (γ) correction unit 54 performs gamma correction processing according to a video signal standard by using lookup table processing corresponding to the number of input/output gradation levels.

A color space conversion unit 55 converts pixel data based on an RGB color space into that based on a YCbCr color space. Here, the color space after the conversion is defined by a standardization standard of video signals. For example, the HDTV standard is specified in ITU-R.BT709. Furthermore, the color space conversion unit 55 performs degeneration processing on color difference signals Cb and Cr, performs conversion into the 4:2:2 format, and then outputs a converted video signal (YCbCr 4:2:2).

In this way, a video signal (YCbCr 4:2:2) of HD resolution and 60 frames per second is output from each of the camera signal processing units 25.

In a case where the video image data processed by the camera signal processing units 25 are compression encoded and are thereafter recorded on the recording units 29, the video image data processed by the #1 camera signal processing unit 25-1, the #2 camera signal processing unit 25-2, the #3 camera signal processing unit 25-3, and the #4 camera signal processing unit 25-4 are supplied to the corresponding ones of the #1 codec unit 28-1, the #2 codec unit 28-2, the #3 codec unit 28-3, and the #4 codec unit 28-4, and are compression encoded. The compression encoded image data streams are respectively supplied to and recorded on the #1 recording unit 29-1, the #2 recording unit 29-2, the #3 recording unit 29-3, and the #4 recording unit 29-4.

Then, in a case where compression encoded image data streams recorded on the recording units 29 are reproduced and output, the camera control unit 11 reads compression encoded data from a predetermined recording unit 29 on the basis of the frame rate of the video image data output from the video output unit 26, and causes the compression encoded data to be decoded using the codec unit 28 and supplied to the video output unit 26. The video output unit 26 performs frame combination, as necessary, on the decoded video image data supplied thereto, and supplies generated video image data to outside as a video output k.

Additionally, also in a case where captured video is directly output, the camera control unit 11 supplies, based on the frame rate of the video image data output from the video output unit 26, processed video image data from a predetermined camera signal processing unit 25 to the video output unit 26. The video output unit 26 performs frame combination on the supplied video image data, and supplies generated video image data to outside as a video output k.

The output frame rate and frame combination will be explained using FIGS. 6 and 7 using, as an example, a case where compression encoded image data streams recorded on the recording units 29 are reproduced.

Each of the recording units 29 has recorded thereon an image data stream that is generated by performing compression encoding after a moving image of a high resolution (here, HD resolution) and a high frame rate (here, 240 frames per second) is divided into four segments in units of frames. In other words, the image data stream recorded on each of the recording units 29 is each a moving image of HD resolution and 60 frames per second, and is shifted in time by one frame with respect to a captured image at 240 frames per second. Specifically, the image data stream recorded on the #1 recording unit 29-1 is a moving image of 60 frames per second in which one out of four frames is extracted within a moving image of 240 frames per second, and the image data stream recorded on the #2 recording unit 29-2 is image data of 60 frames per second that is delayed in time by one frame with respect to the image data stream recorded on the #1 recording unit 29-1. Similarly, the image data stream recorded on the #3 recording unit 29-3 is image data of 60 frames per second that is delayed in time by two frames with respect to the image data stream recorded on the #1 recording unit 29-1, and the image data stream recorded on the #4 recording unit 29-4 is image data of 60 frames per second that is delayed in time by three frames with respect to the image data stream recorded on the #1 recording unit 29-1.

In a case where the compression encoded data recorded on the recording units 29 is reproduced and output, under control of the camera control unit 11, the recorded image data streams are sequentially read, starting from a specified frame, and are decoded and reproduced by the corresponding ones of the codec units 28.

Figure 6:
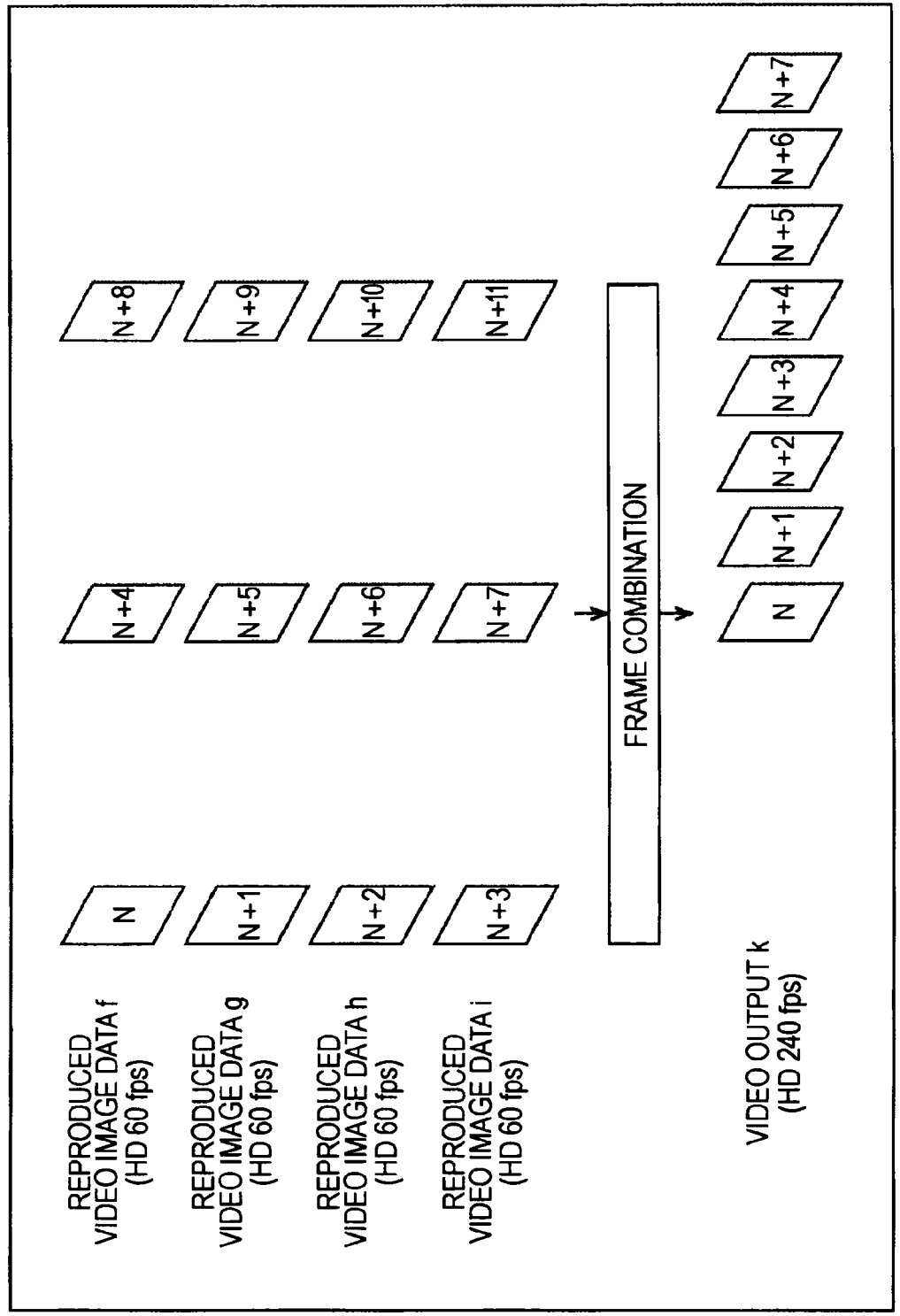
FIG. 6 is a diagram for explaining frame combination.

FIG. 6 illustrates frame combination in a case where video image data of 240 frames per second is output.

In a case where a reproduction operation for an output of 240 frames per second is commanded, the camera control unit 11 controls each of the recording units 29 so that the compression encoded image data stream recorded thereon is read, starting from a specified beginning frame. The four reproduced image data streams are respectively decoded by the codec units 28, and the four video image data items f to i, which have HD resolution and 60 frames per second and which are each shifted by $\frac{1}{240}$ seconds, that is, by one frame in video image data of 240 frames per second, are input to the video output unit 26.

The video output unit 26 temporarily stores the four video image data items f to i in a frame memory (not illustrated), arranges them so as to have HD resolution and a frame rate of 240 frames per second, and reads them in the order of frames illustrated in FIG. 6, that is, in the same order of frames as that during the imaging of 240 frames per second to output them as video signals. In FIG. 6, N, N+1, N+2 . . . , which indicates the order of frames, indicates the order of frames in the case of video image data of 240 frames per second. That is, N, N+1, N+2 . . . , which indicates the order of frames in FIG. 6, indicates the order of arrangement of frames that are shifted by only $\frac{1}{240}$ seconds, which is basically similar to the order of frames in the case of captured video image data of 240 frames per second, which has been explained using FIG. 3.

Specifically, the N-th frame of the video image data item f is output from the #1 codec unit 28-1, the (N+1)-th frame of the video image data item g is output from the #2 codec unit 28-2, the (N+2)-th frame of the video image data item h is output from the #3 codec unit 28-3, and the (N+3)-th frame of the video image data item i is output from the #4 codec unit 28-4. The output frames are supplied to the video output unit 26. Then, the video output unit 26 holds the four frames including the N-th to (N+3)-th frames in the frame memory (not illustrated).

Then, next, the (N+4)-th frame of the video image data item f is output from the #1 codec unit 28-1, the (N+5)-th frame of the video image data item g is output from the #2 codec unit 28-2, the (N+6)-th frame of the video image data item h is output from the #3 codec unit 28-3, and the (N+7)-th frame of the video image data item i is output from the #4 codec unit 28-4. The output frames are supplied to the video output unit 26. The video output unit 26 holds the four frames including the (N+4)-th to (N+7)-th frames in the frame memory (not illustrated). The video output unit 26 also arranges the four frames including the N-th to (N+3)-th frames, which have already been held in the frame memory, in the order of frames, and outputs the four frames as a video output k. That is, the video output k is output with a delay of at least four frames with respect to the timing when the supply of the video image data items g to i to the video output unit 26 is started.

In this way, the video signal k output from the video output unit 26 allows image display at HD resolution and 240 frames per second. By doing so, the high-speed display of a moving image captured by the imaging apparatus 1 can be realized, as compared to a normal frame rate such as, for example, 60 frames per second, without performing complex processing on the moving image.

Here, explanation has been given assuming that the video output unit 26 is designed to output a video signal of HD resolution and 240 frames per second in one broadband video transmission channel. However, the video output unit 26 may be designed to output four-channel video signals of HD resolution and 60 frames per second, which have not been subjected to frame combination, to a display unit (not illustrated) via four video transmission channels in accordance with the specification of a display device (not illustrated) that obtains a video signal k to be output. In the case of doing so, it is necessary for the display device that obtains four-channel video signals of HD resolution and 60 frames per second to execute frame combination for generating a video signal of HD resolution and 240 frames per second from the input four-channel video signals of HD resolution and 60 frames per second in a manner similar to that in the case explained using FIG. 6. Additionally, in this case, the video output unit 26 may output the video image data items f to i of HD resolution and 60 frames per second directly as four-channel video signals without performing frame combination.

Next, the reproduction operation at 120 frames per second will be explained with reference to FIG. 7.

For example, in a case where a video signal of HD resolution and 120 frames per second is output due to the reason of a display device that supports only up to 120 frames per second, a video signal transmission channel that supports only up to 120 frames per second, or the like, the camera control unit 11 causes two recording units 29 among the recording units 29, on which compression encoded image data streams that are each shifted by two frames in movie frames of 240 frames per second are recorded, to supply the compression encoded image data stream recorded thereon to the codec units 28. The two reproduced image data streams are respectively decoded by the codec units 28. Then, the two video image data items f and h (or the video image data items g and i), which have HD resolution and 60 frames per second and each of which is shifted by 2/240 seconds, that is, by two frames in video image data of 240 frames per second, are input to the video output unit 26.

Figure 7:
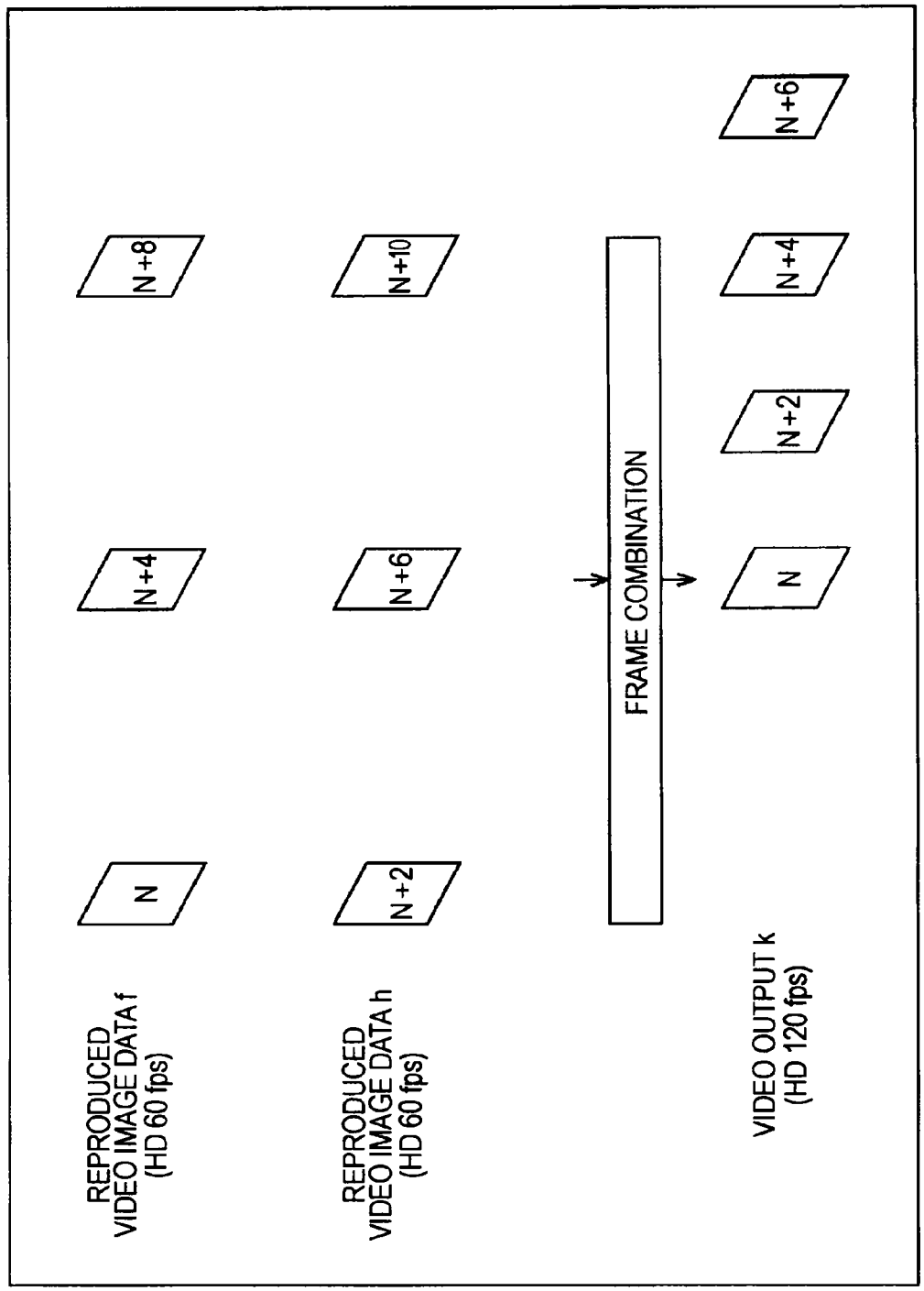
FIG. 7 is a diagram for explaining frame combination.
Figure 8:
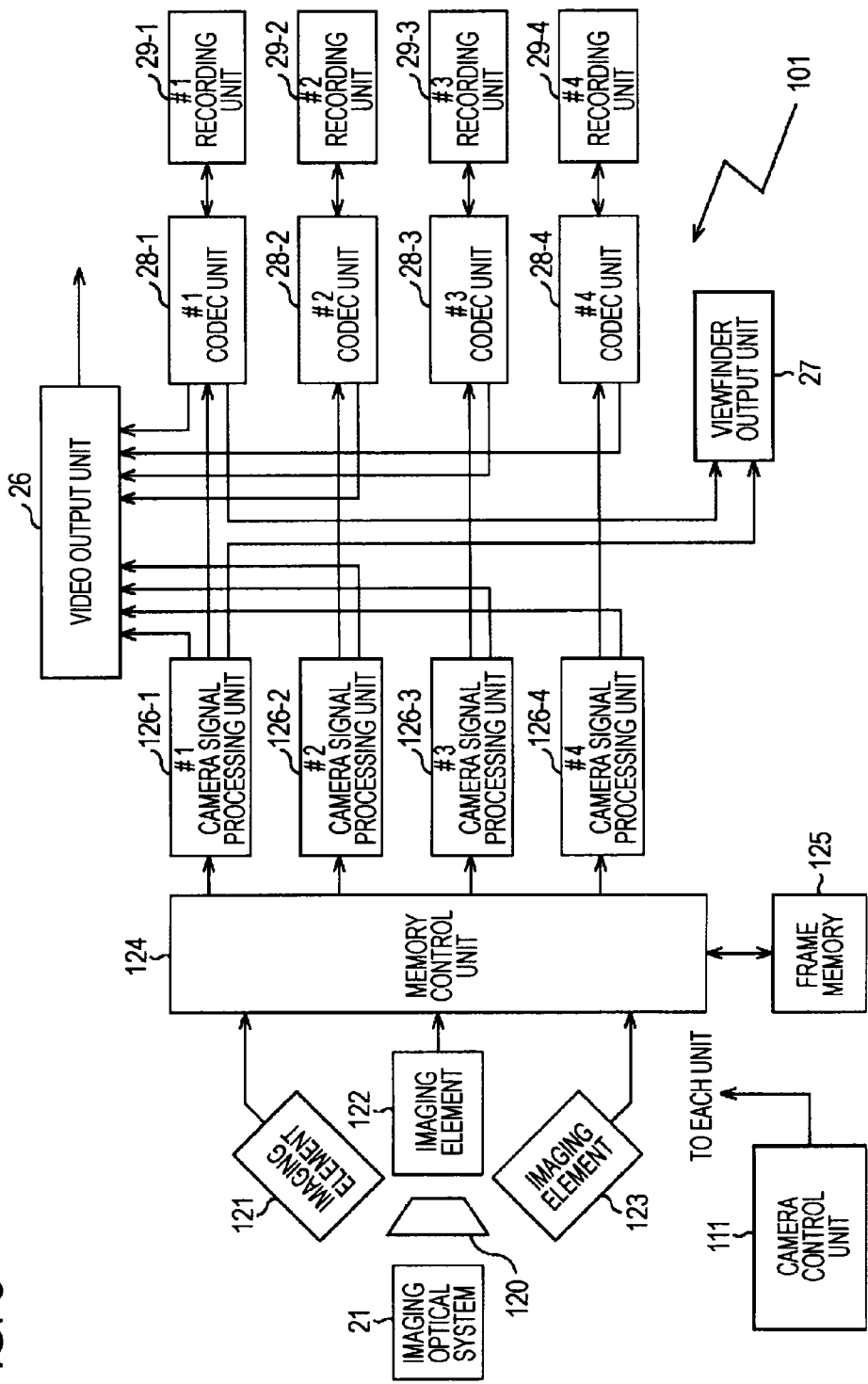
FIG. 8 is a block diagram illustrating a different configuration of the imaging apparatus to which the present invention is applied.

The video output unit 26 temporarily stores the two video image data items f and h in the frame memory (not illustrated), arranges them so as to have HD resolution and a frame rate of 120 frames per second, reads them in the order of frames illustrated in FIG. 7, and outputs them as video signals.

Also in FIG. 7, N, N+2, N+4 . . . , which indicates the order of frames, indicates the order of frames in the case of video image data of 240 frames per second. That is, since the order of frames of the video image data items subjected to frame combination is N, N+2, N+4 . . . , video image data obtained after the frame combination becomes equal to video image data of 120 frames per second that is obtained by decimating the video image data of 240 frames per second by ½.

In this way, the video output unit 26 can output not only a video output k that allows image display at HD resolution and 240 frames per second but also a video output k that allows image display at HD resolution and 120 frames per second without performing complex processing. By doing so, the imaging apparatus 1 can easily generate and output video image data of a plurality of frame rates.

Here, explanation has been given assuming that the video output unit 26 is designed to output a video signal of HD resolution and 120 frames per second in one broadband video transmission channel in accordance with the specification of the display device (not illustrated) that acquires a video signal k to be output. However, for example, the video output unit 26 may be designed to output two-channel video signals of HD resolution and 60 frames per second to a display unit (not illustrated) via two video transmission channels. In the case of doing so, it is necessary for the display device that acquires two-channel video signals of HD resolution and 60 frames per second to execute frame combination for generating a video signal of HD resolution and 120 frames per second from the input two-channel video signals of HD resolution and 60 frames per second in a manner similar to that in the case explained using FIG. 7. Additionally, in this case, the video output unit 26 may output the video image data items f and h of HD resolution and 60 frames per second directly as two-channel video signals without performing frame combination.

Also not illustrated in the figures, furthermore, in a case where the display device supports only a normal frame rate, namely, 60 frames per second, in a case where the transmission channel supports only 60 frames per second, or any other case, the camera control unit 11 controls the respective units to read a compression encoded image data stream from one of the recording units 29, to decode the compression encoded image data stream using the corresponding one of the codec units 28, and to supply video image data of 60 frames per second to the video output unit 26. The video output unit 26 outputs the supplied video image data of HD resolution and 60 frames per second.

In this way, the imaging apparatus 1 performs imaging at a high resolution and a high frame rate, divides a captured moving image in units of frames, and performs parallel processing on resulting data segments. Thereby, image processing, codec, or recording processing for moving image data can be executed at a normal frame rate (for example, 60 frames per second while imaging is performed at 240 frames per second). During reproduction, video data can be output at a plurality of output frame rates without performing complex processing.

Additionally, in a case where a captured image is output to and displayed on the viewfinder (not illustrated), the image data processed by the #1 camera signal processing unit 25-1 is output to the viewfinder output unit 27. Furthermore, in a case where image data to be output as video is output to and displayed on the viewfinder (not illustrated), the image data decoded by the #1 codec unit 28-1 is output to the viewfinder output unit 27. In other words, image data output to the viewfinder has a frame rate of 60 frames per second.

In contrast, for example, in a case where the viewfinder has the capabilities to display a moving image of a frame rate of 120 frames per second, the image data processed by the #3 camera signal processing unit 25-3 in addition to the image data processed by the #1 camera signal processing unit 25-1 may be output to the viewfinder output unit 27, or the image data decoded by the #3 codec unit 28-3 in addition to the image data decoded by the #1 codec unit 28-1 may be output to the viewfinder output unit 27 to perform frame combination and output a result.

Additionally, it goes without saying that in a case where the viewfinder has the capabilities to display a moving image of a frame rate of 240 frames per second, under control of the camera control unit 11, four processed video image data items of 60 frames per second may be supplied from all the camera signal processing units 25 to the video output unit 26, or compression encoded image data streams may be read from all the recording units 29 and may be respectively decoded using the codec units 28. Four video image data items of 60 frames per second may be supplied to the video output unit 26 and subjected to frame combination, and a result may be displayed.

Additionally, in a case where captured and processed image data is output to the outside without being temporarily compressed and recorded, based on the frame rate of the video image data to be output, the video image data processed by a predetermined camera signal processing unit 25 among the #1 camera signal processing unit 25-1, the #2 camera signal processing unit 25-2, the #3 camera signal processing unit 25-3, and the #4 camera signal processing unit 25-4 is supplied to the video output unit 26.

Specifically, in a case where the video image data to be output has a frame rate of 240 frame per second, video image data is supplied to the video output unit 26 from all the #1 camera signal processing unit 25-1, the #2 camera signal processing unit 25-2, the #3 camera signal processing unit 25-3, and the #4 camera signal processing unit 25-4. Then, in a case where the video image data to be output has a frame rate of 120 frames per second, video image data is supplied to the video output unit 26 from two camera signal processing units 25 among the #1 camera signal processing unit 25-1, the #2 camera signal processing unit 25-2, the #3 camera signal processing unit 25-3, and the #4 camera signal processing unit 25-4, which process frames that are each shifted by two frames in movie frames of 240 frames per second. Additionally, in a case where the video image data to be output has a frame rate of 60 frames per second, video image data is supplied to the video output unit 26 from one of the #1 camera signal processing unit 25-1, the #2 camera signal processing unit 25-2, the #3 camera signal processing unit 25-3, and the #4 camera signal processing unit 25-4.

The imaging apparatus 1 described above is configured to capture a moving image at 240 frames per second that is four times 60 frames per second, which is generally widely used for capturing a moving image, to divide captured moving image data into four pieces for each frame to generate four-channel moving image data of 60 frames per second, and to perform various processes so that a moving image of 60 frames per second, 120 frames per second, or 240 frames per second can be reproduced. However, it goes without saying that any other imaging frame rate or any other number of segments of captured moving image data may be used.

Specifically, for example, a moving image captured at 240 frames per second may be divided into two or three segments, or a moving image captured at 120 frames per second may be divided into two or three segments. Additionally, a moving image captured at 200 frames per second may be divided into four segments, or a moving image captured at 100 frames per second may be divided into two segments. Alternatively, a moving image captured at 96 frames per second may be divided into four segments, or a moving image captured at 48 frames per second may be divided into two segments.

At this time, when moving image data segments of each channel have a frame rate that is generally widely used for capturing a moving image, such as, for example, 60 frames per second, 50 frames per second, or 24 frames per second, for example, a general-purpose product can be used for a circuit or the like necessary for signal processing or codec, and cost can be reduced, which is preferable. However, the frame rate of moving image data segments of each channel may be any other value.

Additionally, here, explanation has been given of a case where, by way of example, the frame rates of segments of each channel are equal to each other. However, it goes without saying that segments of each channel may have different frame rates. For example, a moving image captured at 240 frames per second may be divided into one channel for 120 frames per second and two channels for 60 frames per second.

Note that it goes without saying that in a case where the recording units 29 have a large capacity and a high recording rate, in a case where image degradation due to codec is desired to be avoided, or any other case, the codec units 28 may be omitted so that video image data that is not compressed or encoded may be recorded on the recording units 29.

In this manner, the imaging apparatus 1 divides image data captured at a frame rate that is N times (here, four times) a frame rate generally widely used for capturing a moving image, such as, for example, 60 frames per second, 50 frames per second, or 24 frames per second, into N segments in the time direction in units of frames, and is thereby capable of processing or recording high-frame-rate video image data as N normal-frame-rate image data items. Furthermore, the imaging apparatus 1 is capable of outputting moving image data at a plurality of frame rates without performing complex processing.

Additionally, the imaging apparatus 1 includes, as the imaging element 22, a single-plate color solid-state imaging element having, on a light receiving surface, a color filter that transmits light in different waveform ranges for individual pixels. However, it goes without saying that any other scheme may be used as the imaging method. For example, the present invention can also be applied in a three-plate, instead of single-plate color, imaging apparatus.

Figure 9:
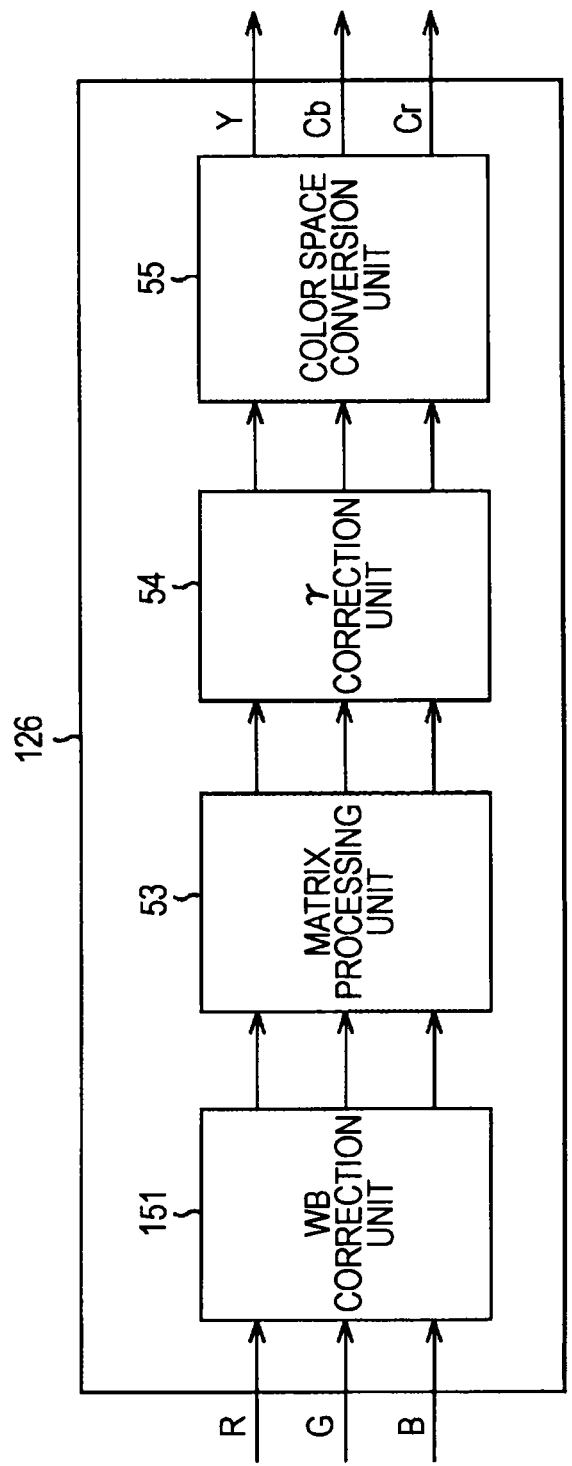
FIG. 9 is a block diagram illustrating a configuration of a camera signal processing unit of FIG. 8.

FIG. 9 is a block diagram illustrating a configuration of a three-plate imaging apparatus 101 that uses three solid-state imaging elements.

Note that portions corresponding to those of the imaging apparatus 1 of FIG. 1 are assigned the same numerals, and explanation thereof is omitted as appropriate. That is, the imaging apparatus 101 has a configuration basically similar to that of the imaging apparatus 1 explained using FIG. 1, except that a camera control unit 111 is provided in place of the camera control unit 11, imaging elements 121 to 123 are provided in place of the imaging element 22, a memory control unit 124 is provided in place of the memory control unit 23, a frame memory 125 is provided in place of the frame memory 24, a #1 camera signal processing unit 126-1, a #2 camera signal processing unit 126-2, a #3 camera signal processing unit 126-3, and a #4 camera signal processing unit 126-4 are provided in place of the #1 camera signal processing unit 25-1, the #2 camera signal processing unit 25-2, the #3 camera signal processing unit 25-3, and the #4 camera signal processing unit 25-4, and a dichroic prism 120 that splits light incident through the imaging optical system 21 is newly provided.

In the following explanation, each of the #1 camera signal processing unit 126-1, the #2 camera signal processing unit 126-2, the #3 camera signal processing unit 126-3, and the #4 camera signal processing unit 126-4 is referred to simply as a camera signal processing unit 126 unless they need to be individually identified.

The camera control unit 111 controls the operation of the respective units of the imaging apparatus 101.

The imaging elements 121, 122, and 123 receive light that is incident through the imaging optical system 21 and that is split by the dichroic prism 120 into the red color component (R), the green color component (G), and the blue color component (B). Here, it is assumed that the imaging element 121 receives light in a wavelength range centered on the red color component (R), the imaging element 122 receives light in a wavelength range centered on the green color component (G), and the imaging element 123 receives light in a wavelength range centered on the blue color component (B).

Figure 3:
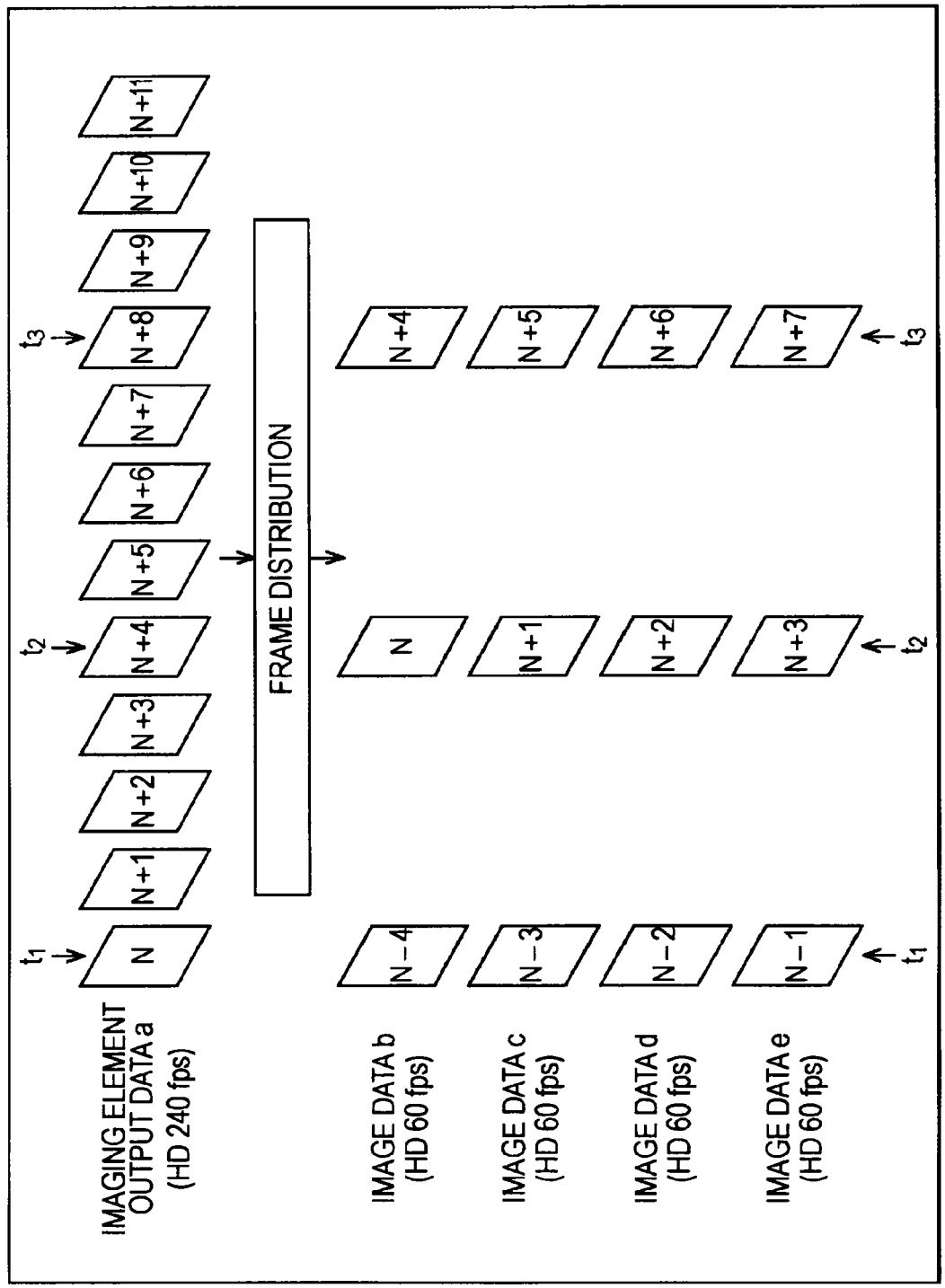
FIG. 3 is a diagram for explaining frame distribution.
Figure 4:
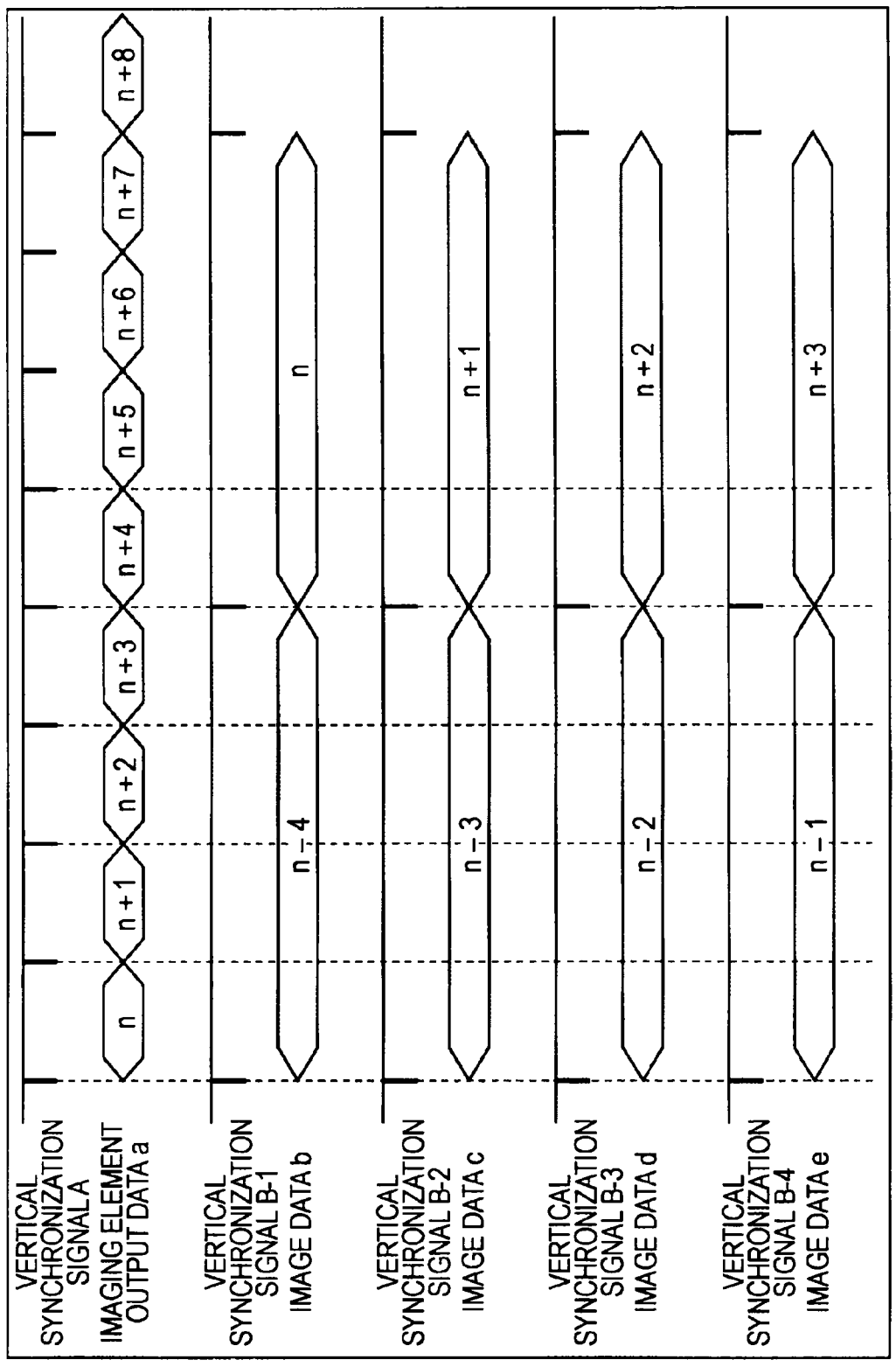
FIG. 4 is a diagram for explaining frame distribution.

Under control of the camera control unit 111, the memory control unit 124 supplies imaging data corresponding to the wavelength ranges centered on the respective RGB color components, which are supplied from the imaging elements 121, 122, and 123, to the frame memory 125 in such a manner that one frame contains three colors, and also divides four frames of imaging data, each frame containing three colors, which are recorded on the frame memory 125, in units of frames using processing similar to that in the case explained using FIGS. 3 and 4 to respectively supply resulting segments to the camera signal processing units 126. The frame memory 125 has a storage capacity capable of holding at least eight frames of imaging data, each frame containing RGB three colors.

Therefore, in the three-plate imaging apparatus 101 that performs imaging using imaging elements, since imaging data of each of R, G, and B can be obtained at a pixel position, it is not necessary for each of the camera signal processing units 126 to perform RGB interpolation synchronization processing.

A configuration of the camera signal processing units 126 is illustrated in FIG. 9.

Note that portions corresponding to those of the camera signal processing unit 25 of FIG. 5 are assigned the same numerals, and explanation thereof is omitted as appropriate. That is, the camera signal processing unit 126 has a configuration basically similar to that of the camera signal processing unit 25 of FIG. 5, except that the RGB interpolation synchronization processing unit 52 is omitted and a WB correction unit 151 is provided in place of the WB correction unit 51.

The WB correction unit 151 is supplied with an image signal having R, G, and B for each pixel, performs R-G-B color balance adjustment for each pixel, and supplies adjusted image signals (R, G, B) to a matrix processing unit 53. The signal processing subsequent to the matrix processing is basically similar to that of the camera signal processing unit 25 explained using FIG. 5.

In this manner, the imaging apparatus 101 is also configured to capture a moving image at 240 frames per second that is four times 60 frames per second, which is generally widely used for capturing a moving image, to divide captured moving image data into four pieces for each frame to generate four-channel moving image data of 60 frames per second, and to perform various processes so that a moving image of 60 frames per second, 120 frames per second, or 240 frames per second can be reproduced. However, it goes without saying that any other imaging frame rate or any other number of segments of captured moving image data may be used.

Specifically, for example, a moving image captured at 240 frames per second may be divided into two or three segments, or a moving image captured at 120 frames per second may be divided into two or three segments. Additionally, a moving image captured at 200 frames per second may be divided into four segments, or a moving image captured at 100 frames per second may be divided into two segments. Alternatively, a moving image captured at 96 frames per second may be divided into four segments, or a moving image captured at 48 frames per second may be divided into two segments.

At this time, when moving image data segments of each channel have a frame rate that is generally widely used for capturing a moving image, such as, for example, 60 frames per second, 50 frames per second, or 24 frames per second, for example, a general-purpose product can be used for a circuit or the like necessary for signal processing or codec, and cost can be reduced, which is preferable. However, the frame rate of moving image data segments of each channel may be any other value.

Additionally, also here, explanation has been given of a case where, by way of example, the frame rates of segments of each channel are equal to each other. However, it goes without saying that segments of each channel may have different frame rates. For example, a moving image captured at 240 frames per second may be divided into one channel for 120 frames per second and two channels for 60 frames per second.

Note that, also in the imaging apparatus 101, it goes without saying that in a case where the recording units 29 have a large capacity and a high recording rate, in a case where image degradation due to codec is desired to be avoided, or any other case, the codec units 28 may be omitted so that video image data that is not compressed or encoded may be recorded on the recording units 29.

In this manner, like the imaging apparatus 1, the imaging apparatus 101 also divides image data captured at a frame rate that is N times (here, four times) a frame rate generally widely used for capturing a moving image, such as, for example, 60 frames per second, 50 frames per second, or 24 frames per second, into N segments in the time direction in units of frames, and is thereby capable of processing or recording a high-frame-rate video signal as N normal-frame-rate image data items. Furthermore, the imaging apparatus 1 is capable of outputting moving image data at a plurality of frame rates without performing complex processing.

Next, an imaging/recording/output process executed by the imaging apparatus 1 or the imaging apparatus 101 will be explained with reference to a flowchart of FIG. 10.

Figure 10:
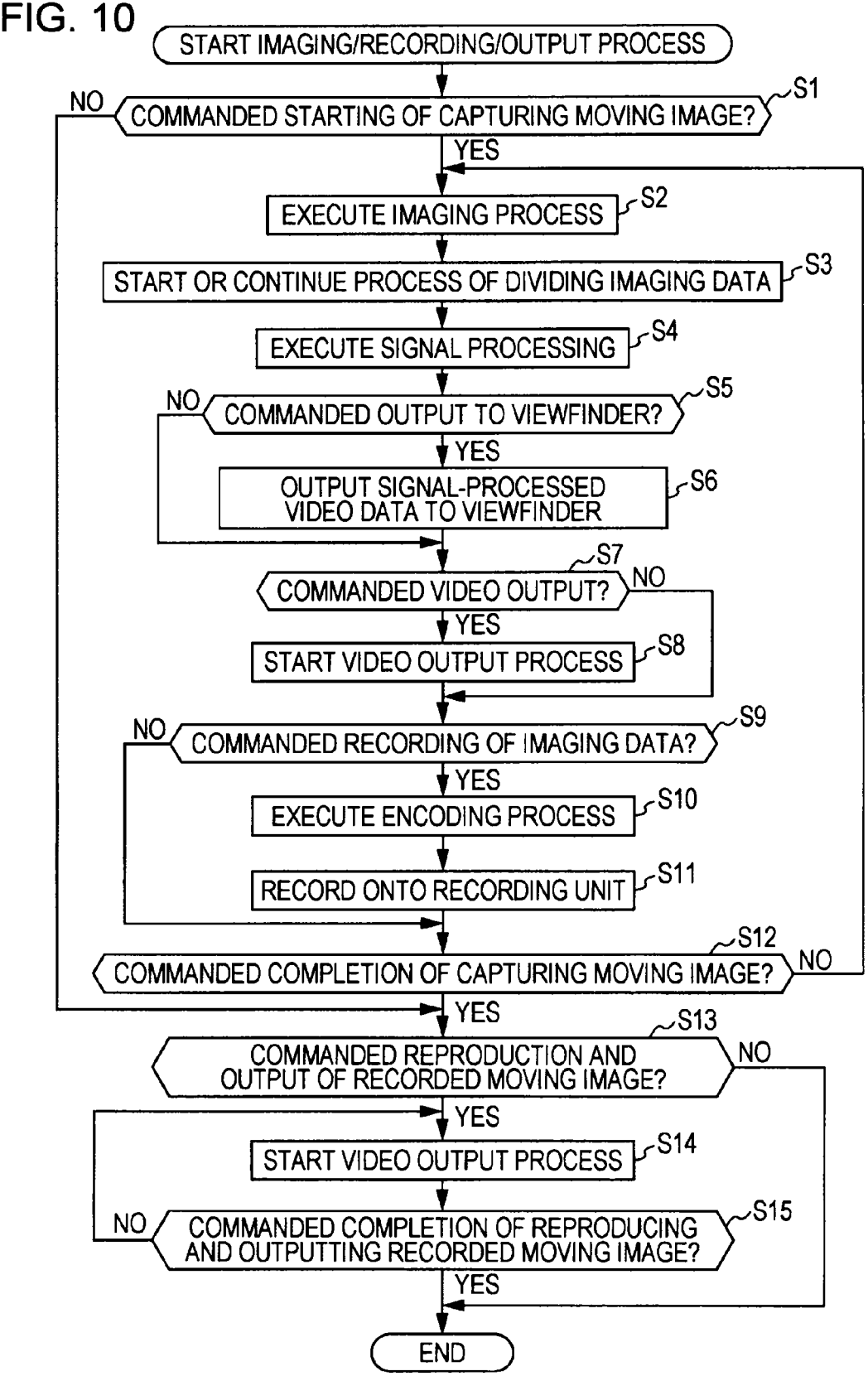
FIG. 10 is a flowchart for explaining an imaging/recording/output process.

Note that although, in the flowchart of FIG. 10, for ease of understanding, each of the imaging, recording, and outputting processes is explained in terms of individual steps, it goes without saying that these processes can be executed in parallel in the imaging apparatus 1 or the imaging apparatus 101.

In step S1, the camera control unit 11 or the camera control unit 111 determines whether or not starting of capturing a moving image has been commanded from an operation input unit (not illustrated) or the like. In a case where it is determined in step S1 that starting of capturing a moving image has not been commanded, the process proceeds to step S13 described below.

In a case where it is determined in step S1 that starting of capturing a moving image has been commanded, in step S2, the camera control unit 11 or the camera control unit 111 controls the respective units to execute an imaging process.

Specifically, the camera control unit 11 controls the imaging optical system 21 to cause light, which corresponds to an image to be captured, to be incident on the imaging element 22. Under control of the camera control unit 11, the imaging element 22 acquires an image signal configured by a pixel data having a color pattern according to a Bayer pattern as illustrated in FIG. 2 at a high resolution (here, for example, HD resolution) and a high frame rate (here, for example, 240 frames per second, that is, referred to as 240 Hz), and supplies the image signal to the memory control unit 23. Additionally, the camera control unit 111 controls the imaging optical system 21 to split the light corresponding to an image to be captured into the red color component (R), the green color component (G), and the blue color component (B) using the dichroic prism 120, and thereafter causes the components to be incident on the imaging elements 121 to 123, respectively. Under control of the camera control unit 111, the imaging elements 121 to 123 acquire image signals by receiving light corresponding to the wavelength ranges of the respective RGB color components at a high resolution (here, for example, HD resolution) and a high frame rate (here, for example, 240 frames per second, that is, referred to as 240 Hz), and supply the image signals to the memory control unit 23.

In step S3, the camera control unit 11 or the camera control unit 111 controls the respective units to start or continue the process of dividing imaging data.

Specifically, under control of the camera control unit 11 or the camera control unit 111, the memory control unit 23 or the memory control unit 124 divides the imaging data supplied from the imaging element 22 or the imaging elements 121, 122, and 123 in units of frames in the manner explained using FIGS. 3 and 4, and respectively supplies resulting imaging data segments to the camera signal processing units 25 or the camera signal processing units 126.

In step S4, the camera signal processing units 25 or the camera signal processing units 126 execute signal processing under control of the camera control unit 11 or the camera control unit 111.

Specifically, as explained using FIG. 5, the camera signal processing units 25 correct the white balance of RAW data supplied thereto, execute RGB interpolation synchronization, that is, demosaic processing, and perform matrix processing and γ correction. Thereafter, the camera signal processing units 25 perform color space conversion, and output generated video signals (YCbCr 4:2:2) of HD resolution and 60 frames per second. Additionally, as explained using FIG. 9, the camera signal processing units 126 correct the white balance of image data constituted by the respective RGB components, and perform matrix processing and γ correction. Thereafter, the camera signal processing units 126 perform color space conversion, and output generated video signals (YCbCr 4:2:2) of HD resolution and 60 frames per second.

In step S5, the camera control unit 11 or the camera control unit 111 determines whether or not the output of an image that is being captured to the viewfinder has been commanded.

In a case where it is determined in step S5 that the output to the viewfinder has been commanded, in step S6, the camera control unit 11 or the camera control unit 111 controls the process of outputting signal-processed video data to the viewfinder.

Specifically, under control of the camera control unit 11 or the camera control unit 111, the viewfinder output unit 27 acquires the video signal output from the #1 camera signal processing unit 25-1 or the #1 camera signal processing unit 126-1, and converts the video signal into a signal that can be displayed on the viewfinder. Thereafter, the viewfinder output unit 27 outputs the signal to the viewfinder, which is not illustrated, to display a moving image of a frame rate of 60 frames per second.

Note that an input signal of the viewfinder is an RGB signal, the viewfinder output unit 27 may be configured to directly acquire an RGB signal, which has not been subjected to color space conversion processing by the #1 camera signal processing unit 25-1 or the #1 camera signal processing unit 126-1. Additionally, when the frame rate of a moving image that can be displayed on the viewfinder is a frame rate of, for example, 120 frames per second, the viewfinder output unit 27 may be designed to acquire the video signals output from the #1 camera signal processing unit 25-1 and the #3 camera signal processing unit 25-3 or the #1 camera signal processing unit 126-1 and the #3 camera signal processing unit 126-3 (or the #2 camera signal processing unit 25-2 and the #4 camera signal processing unit 25-4 or the #2 camera signal processing unit 126-2 and the 4 camera signal processing unit 126-4), to perform frame combination, and to output a result to the viewfinder (not illustrated). Alternatively, when the frame rate of a moving image that can be displayed on the viewfinder is a frame rate of, for example, 240 frames per second, the viewfinder output unit 27 may be designed to acquire the video signals output from all the camera signal processing units 25 or all the camera signal processing units 126, to perform frame combination, and to output a result to the viewfinder (not illustrated).

In a case where it is determined in step S5 that the output to the viewfinder has not been commanded, or after the completion of the processing of step S6, in step S7, the camera control unit 11 or the camera control unit 111 determines whether or not the video output of an image that is being captured has been commanded.

In a case where it is determined in step S7 that the video output of an image that is being captured has been commanded, in step S8, the camera control unit 11 or the camera control unit 111 starts a video output process.

Specifically, under control of the camera control unit 11 or the camera control unit 111, the video output unit 26 acquires signal-processed video signals from the camera signal processing units 25 or the camera signal processing units 126, performs frame combination, as necessary, to generate a video signal of a predetermined frame rate, and outputs the video signal as a video output indicated by k in the figures to, for example, an external recording device or display device, a predetermined signal transmission line, or the like.

At this time, under control of the camera control unit 11 or the camera control unit 111, the video output unit 26 acquires video data based on the frame rate of a video signal to be output from the camera signal processing units 25 or the camera signal processing units 126, and performs frame combination.

Specifically, in a case where moving image data of a frame rate of 60 frames per second is output, processed video image data of 60 frames per second is supplied from one of the camera signal processing units 25 or one of the camera signal processing units 126 to the video output unit 26, and is supplied to the video output unit 26. The video output unit 26 outputs the supplied video image data of 60 frames per second.

Additionally, in a case where moving image data of a frame rate of 120 frames per second is output, processed two-channel video image data of 60 frames per second is supplied to the video output unit 26 from two camera signal processing units 25 among the camera signal processing units 25 or the camera signal processing units 126, which process frames that are each shifted by two frames in movie frames of 240 frames per second. As explained using FIG. 7, the video output unit 26 performs frame combination so that the supplied two-channel video image data of 60 frames per second can be alternately arranged on a frame-by-frame basis, and outputs combined video image data.

Additionally, in a case where moving image data of a frame rate of 240 frames per second is output, processed four-channel video image data of 60 frames per second is supplied to the video output unit 26 from all the camera signal processing units 25 or all the camera signal processing units 126. As explained using FIG. 6, the video output unit 26 performs frame combination so that the supplied four-channel video image data of 60 frames per second can be sequentially arranged on a frame-by-frame basis, and outputs combined video image data.

In a case where it is determined in step S7 that the video output has not been commanded, or after the completion of the processing of step S8, in step S9, the camera control unit 11 or the camera control unit 111 determines whether or not the recording of the imaging data has been commanded.

In a case where it is determined in step S9 that the recording of the imaging data has been commanded, in step S10, under control of the camera control unit 11 or the camera control unit 111, the codec units 28 execute the process of encoding the signal-processed video image data supplied from the camera signal processing units 25 or the camera signal processing units 126.

In step S11, the codec units 28 supply compression encoded image data streams to the recording units 29 for recording.

In a case where it is determined in step S9 that the recording of the imaging data has not been commanded, or after the completion of the processing of step S11, in step S12, the camera control unit 11 or the camera control unit 111 determines whether or not completion of capturing a moving image has been commanded. In a case where it is determined in step S12 that completion of capturing a moving image has not been commanded, the process returns to step S2, and the subsequent processing is repeated.

In a case where it is determined in step S1 that starting of capturing a moving image has not been commanded or in a case where it is determined in step S12 that completion of capturing a moving image has been commanded, in step S13, the camera control unit 11 or the camera control unit 111 determines whether or not reproduction and output of the moving image recorded on the recording units 29 have been commanded.

In a case where it is determined in step S13 that reproduction and output of the moving image recorded on the recording units 29 have been commanded, in step S14, the camera control unit 11 or the camera control unit 111 starts a video output process.

Specifically, as explained using FIGS. 6 and 7, under control of the camera control unit 11 or the camera control unit 111, the video output unit 26 acquires decoded reproduction image data from the codec units 28, performs frame combination, as necessary, to generate a video signal of a predetermined frame rate, and outputs the video signal as a video output indicated by k in the figures to, for example, an external recording device or display device, a predetermined signal transmission line, or the like.

At this time, under control of the camera control unit 11 or the camera control unit 111, the video output unit 26 acquires video data based on the frame rate of a video signal to be output from the codec units 28, and performs frame combination.

Specifically, in a case where moving image data of a frame rate of 60 frames per second is output, a compression encoded image data stream is read from one of the recording units 29, and is decoded by the corresponding one of the codec units 28 so that video image data of 60 frames per second is supplied to the video output unit 26. The video output unit 26 outputs the supplied video image data of 60 frames per second.

Additionally, in a case where moving image data of a frame rate of 120 frames per second is output, a compression encoded image data stream is read from two recording units 29 among the recording units 29, on which compression encoded image data streams that are each shifted by two frames in movie frames of 240 frames per second are recorded, and is decoded by the corresponding one of the codec units 28 so that two video image data items of 60 frames per second are supplied to the video output unit 26. As explained using FIG. 7, the video output unit 26 performs frame combination so that the two supplied video image data items of 60 frames per second can alternately be arranged on a frame-by-frame basis, and outputs combined video image data.

Additionally, in a case where moving image data of a frame rate of 240 frames per second is output, compression encoded image data streams are read from all the recording units 29, and are respectively decoded by the codec units 28 so that four video image data items of 60 frames per second are supplied to the video output unit 26. As explained using FIG. 6, the video output unit 26 performs frame combination so that the four supplied video image data items of 60 frames per second can be sequentially arranged on a frame-by-frame basis, and outputs combined video image data.

Furthermore, when the viewfinder output of a moving image to be reproduced and output has been commanded, under control of the camera control unit 11 or the camera control unit 111, the viewfinder output unit 27 receives the video signal output from the #1 codec unit 28-1, converts the video signal into a signal that can be displayed on the viewfinder, and thereafter outputs the signal to the viewfinder (not illustrated) to display a moving image of a frame rate of 60 frames per second.

In step S15, the camera control unit 11 or the camera control unit 111 determines whether or not completion of reproducing and outputting the recorded moving image has been commanded. In a case where it is determined in step S15 that completion of reproducing and outputting the recorded moving image has not been commanded, the process returns to step S14, and the subsequent processing is repeated.

In a case where it is determined in step S13 that reproduction and output of the recorded moving image have not been commanded or in a case where it is determined in step S15 that completion of reproducing and outputting the recorded moving image has been commanded, the process ends.

With such a process as above, in the imaging apparatus 1 or the imaging apparatus 101, a movie having a high frame rate is captured and captured data is divided in units of frames. Thereby, moving image data having a high frame rate can be subjected to signal processing or encoding and can be recorded without using complex processing or a high-speed signal processing circuit.

Moreover, even if the frame rate that matches the display capabilities of the viewfinder is lower than the frame rate of an image to be captured, a movie captured at a frame rate that matches the display capabilities of the viewfinder can be displayed on the viewfinder without performing complex processing. Additionally, even in a case where the frame rate of desired output data is different from the frame rate of recorded data, data of a predetermined frame rate can be output without performing complex processing.

Figure 11:
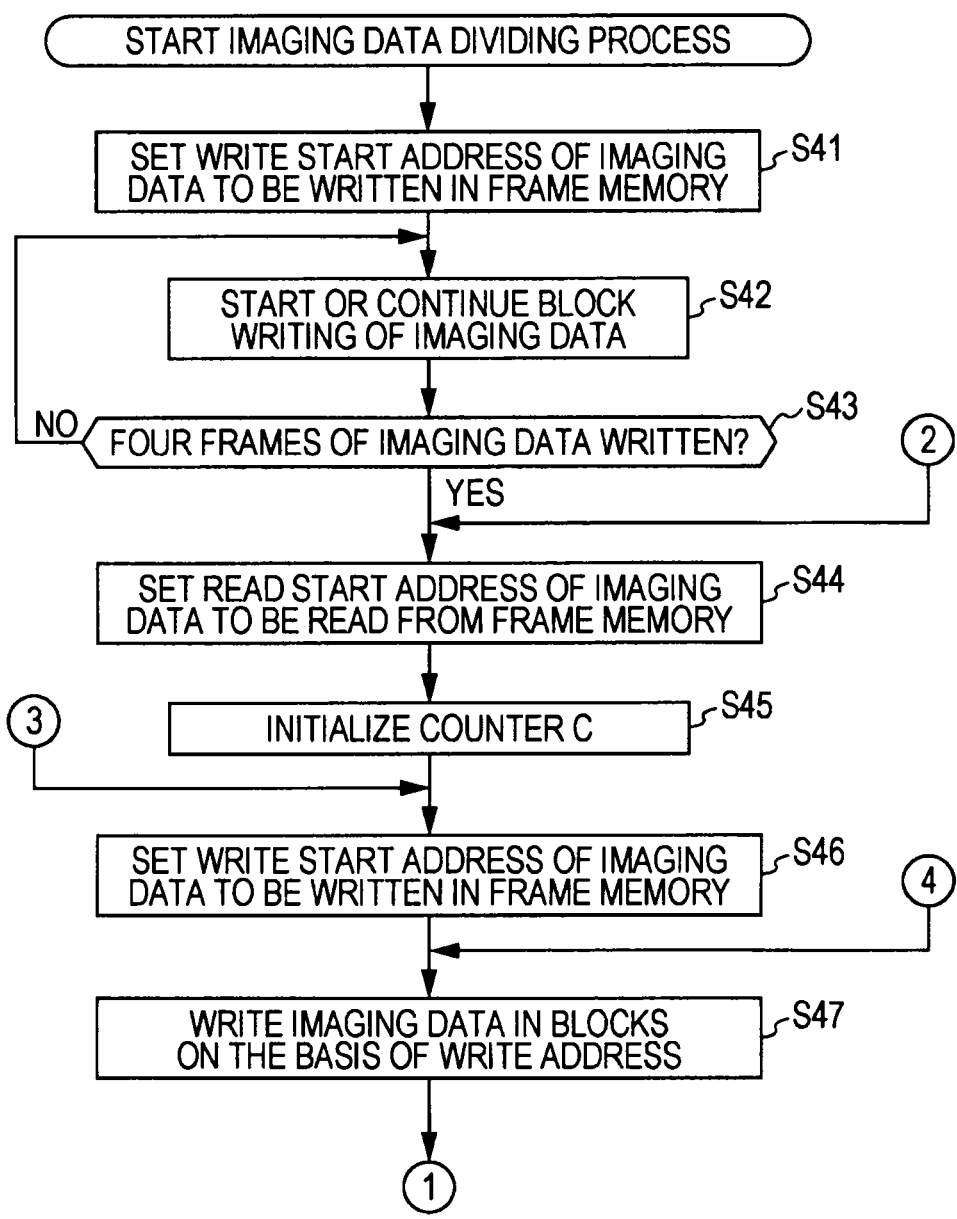
FIG. 11 is a flowchart for explaining an imaging data dividing process.
Figure 12:
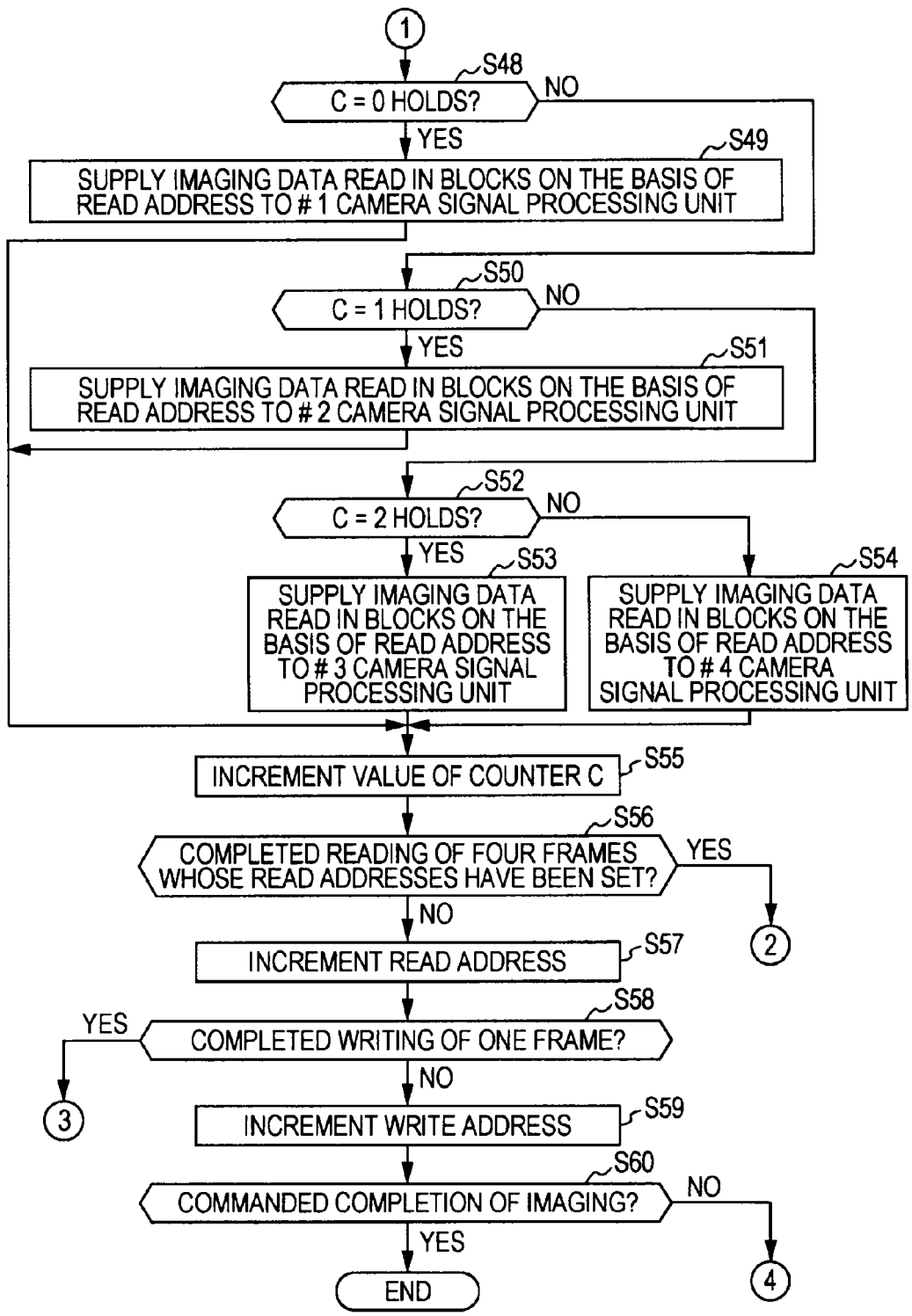
FIG. 12 is a flowchart for explaining the imaging data dividing process.

Next, an imaging data dividing process executed by the imaging apparatus 1 or the imaging apparatus 101 will be explained with reference to a flowchart of FIGS. 11 and 12.

In step S41, the camera control unit 11 or the camera control unit 111 sets a write start address of imaging data to be written from the memory control unit 23 to the frame memory 24 or from the memory control unit 124 to the frame memory 125.

In step S42, the camera control unit 11 or the camera control unit 111 starts or continues block writing of the imaging data from the memory control unit 23 to the frame memory 24 or from the memory control unit 124 to the frame memory 125. Here, the term block is the unit of data that can be exchanged once the frame memory 24 or the frame memory 125 is accessed, and is here assumed to be one line of pixel data.

In step S43, the camera control unit 11 or the camera control unit 111 determines whether or not four frames of imaging data have been written in the frame memory 24 or the frame memory 125. In a case where it is determined in step S43 that four frames of imaging data have not been written, the process returns to step S42, and the subsequent processing is repeated.

In a case where it is determined in step S43 that four frames of imaging data have been written, in step S44, the camera control unit 11 or the camera control unit 111 sets, for four frames, read start addresses of imaging data to be read from the frame memory 125.

Here, the read start addresses of the imaging data to be read from the frame memory 24 or the frame memory 125 coincide with the beginning addresses of the respective four frames of imaging data written in the frame memory 24 or the frame memory 125. That is, the read start addresses of the four frames of imaging data are set so that the four frames of imaging data written in the frame memory 24 or the frame memory 125 on the basis of the write start address set in the processing of step S41 or S46, which will be described below, can sequentially be read in parallel.

In step S45, the camera control unit 11 or the camera control unit 111 initializes the value of a counter C used for determining a destination to which the imaging data read from the frame memory 24 or the frame memory 125 is supplied.

In step S46, the camera control unit 11 or the camera control unit 111 sets a write start address of imaging data to be written next from the memory control unit 23 to the frame memory 24 or from the memory control unit 124 to the frame memory 125. In step S46, a write start address for writing new four frames of imaging data in an area different from a recording area of the four frames of imaging data written in the frame memory 24 or the frame memory 125 presently.

In step S47, the camera control unit 11 or the camera control unit 111 starts or continues block writing of the imaging data from the memory control unit 23 to the frame memory 24 or from the memory control unit 124 to the frame memory 125 on the basis of the value of the write address set in step S46 or a value of a write address that is incremented in the processing described below.

In step S48, the camera control unit 11 or the camera control unit 111 determines whether or not the value of the counter C used for determining a destination to which the imaging data read from the frame memory 24 or the frame memory 125 is supplied meets the condition C=0.

In a case where it is determined in step S48 that the value of the counter C meets the condition C=0, in step S49, the camera control unit 11 or the camera control unit 111 causes the imaging data to be read in blocks from the frame memory 24 to the memory control unit 23 or from the frame memory 125 to the memory control unit 124 on the basis of the read address of the temporally earliest frame among the four frames of imaging data that have been written in the frame memory 24 or the frame memory 125, that is, whose read addresses have been set. Under control of the camera control unit 11 or the camera control unit 111, the memory control unit 23 or the memory control unit 124 supplies one block of imaging data, which has been read therein, to the #1 camera signal processing unit 25-1 or the #1 camera signal processing unit 126-1, and the process proceeds to step S55.

In a case where it is determined in step S48 that the value of the counter C does not meet the condition C=0, in step S50, the camera control unit 11 or the camera control unit 111 determines whether or not the value of the counter C used for determining a destination to which the imaging data read from the frame memory 24 or the frame memory 125 is supplied meets the condition C=1.

In a case where it is determined in step S50 that the value of the counter C meets the condition C=1, in step S51, the camera control unit 11 or the camera control unit 111 causes the imaging data to be read in blocks from the frame memory 24 to the memory control unit 23 or from the frame memory 125 to the memory control unit 124 on the basis of the read address of the temporally second earliest frame among the four frames of imaging data that have been written in the frame memory 24 or the frame memory 125, that is, whose read addresses have been set. Under control of the camera control unit 11 or the camera control unit 111, the memory control unit 23 or the memory control unit 124 supplies one block of imaging data, which has been read therein, to the #2 camera signal processing unit 25-2 or the #2 camera signal processing unit 126-2, and the process proceeds to step S55.

In a case where it is determined in step S50 that the value of the counter C does not meet the condition C=1, in step S52, the camera control unit 11 or the camera control unit 111 determines whether or not the value of the counter C used for determining a destination to which the imaging data read from the frame memory 24 or the frame memory 125 is supplied meets the condition C=2.

In a case where it is determined in step S52 that the value of the counter C meets the condition C=2, in step S53, the camera control unit 11 or the camera control unit 111 causes the imaging data to be read in blocks from the frame memory 24 to the memory control unit 23 or from the frame memory 125 to the memory control unit 124 on the basis of the read address of the temporally third earliest frame among the four frames of imaging data that have been written in the frame memory 24 or the frame memory 125, that is, whose read addresses have been set. Under control of the camera control unit 11 or the camera control unit 111, the memory control unit 23 or the memory control unit 124 supplies one block of imaging data, which has been read therein, to the #3 camera signal processing unit 25-3 or the #3 camera signal processing unit 126-3, and the process proceeds to step S55.

In a case where it is determined in step S52 that the value of the counter C does not meet the condition C=2, the value of the counter C meets the condition C=3. Thus, in step S54, the camera control unit 11 or the camera control unit 111 causes the imaging data to be read in blocks from the frame memory 24 to the memory control unit 23 or from the frame memory 125 to the memory control unit 124 on the basis of the read address of the temporally last frame among the four frames of imaging data that have been written in the frame memory 24 or the frame memory 125, that is, whose read addresses have been set. Under control of the camera control unit 11 or the camera control unit 111, the memory control unit 23 or the memory control unit 124 supplies one block of imaging data, which has been read therein, to the #4 camera signal processing unit 25-4 or the #4 camera signal processing unit 126-4, and the process proceeds to step S55.

After the completion of the processing of step S49, S51, S53, or S54, in step S55, the camera control unit 11 or the camera control unit 111 increments the value of the counter C used for determining a destination to which the imaging data read from the frame memory 24 or the frame memory 125 is supplied. Here, when the value of the counter C is 3, the counter C is initialized to 0.

In step S56, the camera control unit 11 or the camera control unit 111 determines whether or not the reading of the four frames whose read addresses have been set has been completed. In a case where it is determined in step S56 that the reading of the four frames whose read addresses have been set has been completed, the process returns to step S44, and the subsequent processing is repeated.

In a case where it is determined in step S56 that the reading of the four frames whose read addresses have been set has not been completed, in step S57, the camera control unit 11 or the camera control unit 111 increments the read address corresponding to the frame read in the processing of step S49, S51, S53, or S54.

In step S58, the camera control unit 11 or the camera control unit 111 determines whether or not the writing of one frame, whose write start address has been set in step S46, in the frame memory 24 or the frame memory 125 has been completed. In a case where it is determined in step S58 that the writing of one frame has been completed, the process returns to step S46, and the subsequent processing is repeated.

In a case where it is determined in step S58 that the writing of one frame has not been completed, in step S59, the camera control unit 11 or the camera control unit 111 increments the write address.

In step S60, the camera control unit 11 or the camera control unit 111 determines whether or not completion of imaging has been commanded.

In a case where it is determined in step S60 that completion of imaging has not been commanded, the process returns to step S47, and the subsequent processing is repeated. In a case where it is determined in step S60 that completion of imaging has been commanded, the process ends.

With such a process as above, captured video image data is divided into four video image data segments of a frame rate that is one quarter the imaging frame rate, and the video image data segments are respectively supplied to the four camera signal processing units in parallel. In other words, captured video image data is such that portions of the data constituting the respective frames are sequentially supplied to the four camera signal processing units in parallel so that a frame can be supplied to each of the four camera signal processing units. Therefore, the imaging apparatus 1 and the imaging apparatus 101 forms N parallel streams of imaging data of a high resolution and a high frame rate that is N times (for example, four times) a frame rate generally widely used for capturing a moving image (for example, 60 frames per second), thereby being capable of performing signal processing, image compression processing, and recording processing similar to those in a case where an image is captured at a normal frame rate.

Additionally, the imaging apparatus 1 or the imaging apparatus 101 is capable of outputting imaging data as video in the processing of step S8 of FIG. 10 or outputting recorded data as video in the processing of step S14 of FIG. 10. As described above, the frame rate required for video output may be different from the imaging frame rate. Specifically, in a case where the imaging frame rate is 4M frames per second (where M is, for example, a value corresponding to a frame rate generally widely used for capturing a moving image), the frame rate of a video signal to be output may be M frames per second, 2M frames per second, or 4M frames per second.

Figure 13:
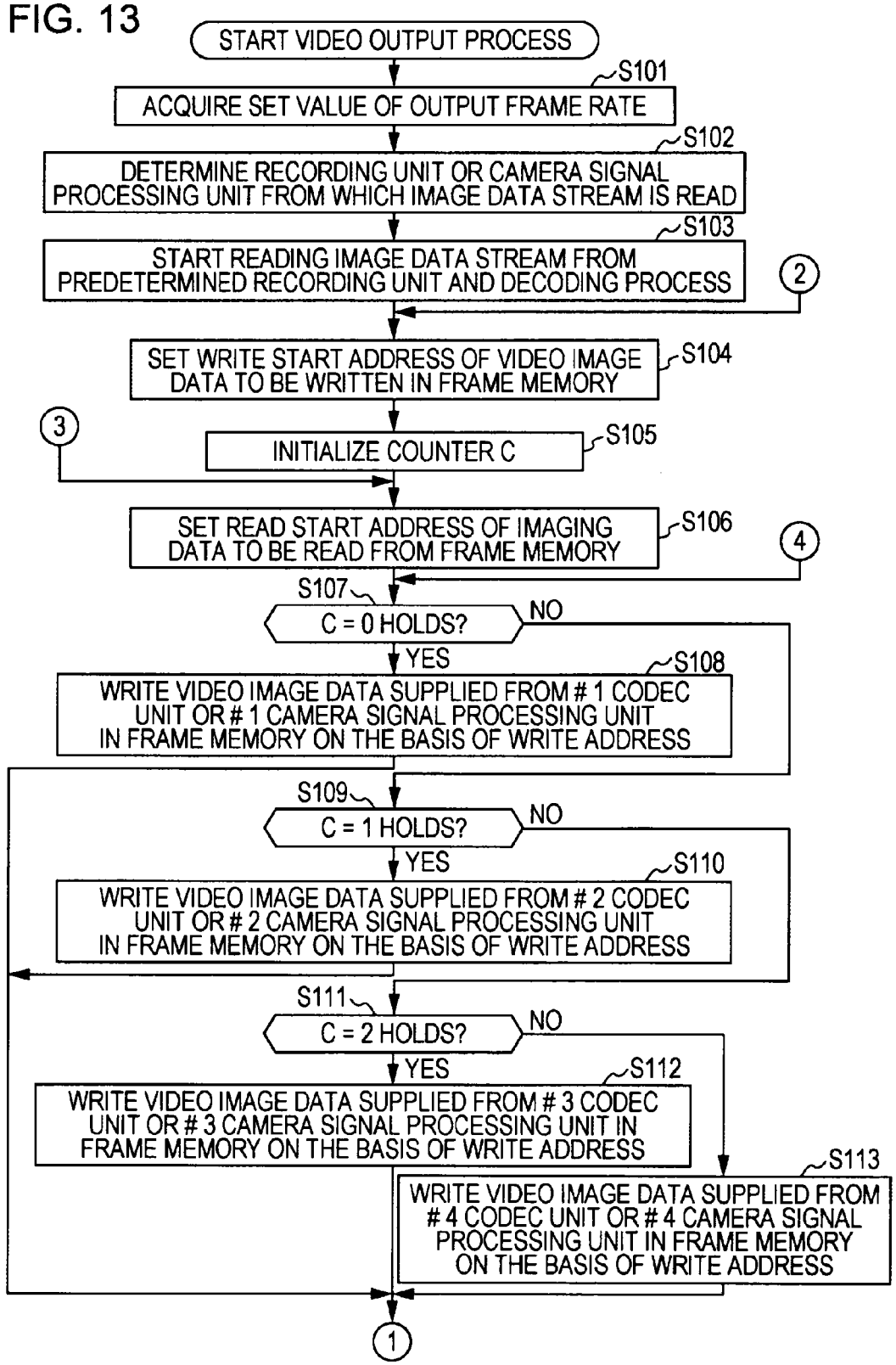
FIG. 13 is a flowchart for explaining a video output process.
Figure 14:
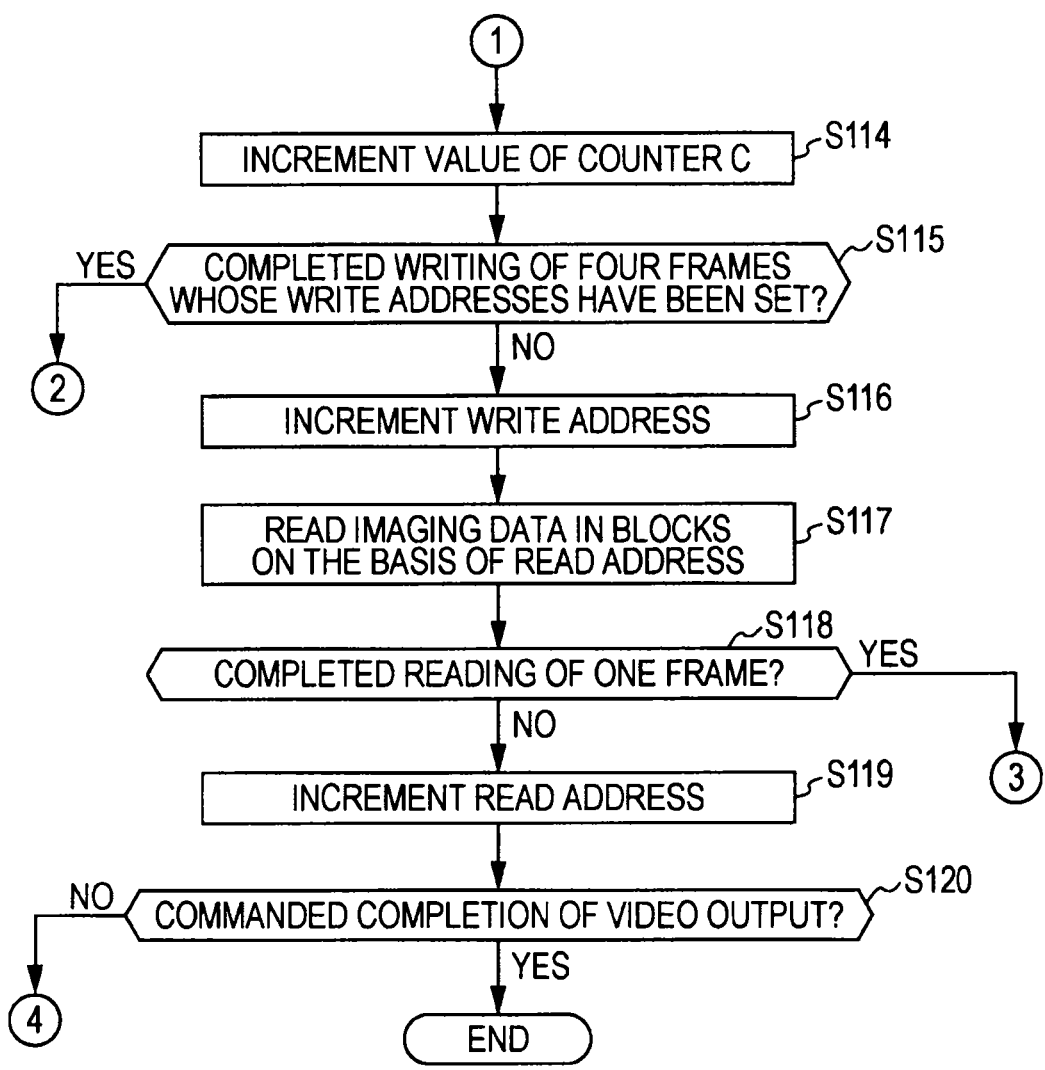
FIG. 14 is a flowchart for explaining the video output process.

Next, a video output process executed in the imaging apparatus 1 or the imaging apparatus 101 will be explained with reference to a flowchart of FIGS. 13 and 14.

In step S101, the camera control unit 11 or the camera control unit 111 acquires a set value of an output frame rate. Here, explanation will be given of a case where an image is captured at a frame rate of 240 frames per second, four data segments are subjected to frame combination, and resulting data is output at 240 frames per second.

In step S102, the camera control unit 11 or the camera control unit 111 determines a recording unit 29 or a camera signal processing unit 25 or 126 from which an image data stream is read on the basis of the set value of the output frame rate.

Specifically, in a case where data captured at a frame rate of 240 frames per second in the imaging apparatus 1 or the imaging apparatus 101 is divided into four segments, if the output frame rate is 60 frames per second, the four recording units 29 or one of the camera signal processing units 25 or 126 is selected as the target from which an image data stream is read. If the output frame rate is 120 frames per second, the four recording units 29 or two of the camera signal processing units 25 or 126, which have discontinuous (shifted by two frames) frames of data, are selected as the target from which an image data stream is read. If the output frame rate is 240 frames per second, the four recording units 29 or all the camera signal processing units 25 or 126 are selected as the target from which an image data stream is read.

In step S103, when video output is a process of outputting the data recorded on the recording units 29, the camera control unit 11 or the camera control unit 111 starts to read an image data stream from a predetermined recording unit 29 and to control a codec unit 28 to perform decoding processing.

In step S104, the camera control unit 11 or the camera control unit 111 sets, for four frames, write start addresses of video image data to be written in the frame memory (not illustrated) of the video output unit 26.

In step S105, the camera control unit 11 or the camera control unit 111 initializes the value of the counter C for determining a codec unit 28 or a camera signal processing unit 25 or 126 from which data to be written in the frame memory (not illustrated) of the video output unit 26 is acquired.

Here, explanation will be given assuming that an image is captured at a frame rate of 240 frames per second, and four data segments are subjected to frame combination, and resulting data is output at 240 frames per second. Thus, it is assumed that the value of the counter C is incremented in a range of 0 to 3. In contrast, in a case where frames that constitute two-channel video image data of 60 frames per second among four-channel data segments are combined and a result is output at 120 frames per second, the value of the counter C alternately takes 0 and 2 or alternately takes 1 and 3. Additionally, in a case where video image data is output at 60 frames per second, the value of the counter C is not incremented, and is constant in a range of 0 to 3.

In step S106, the camera control unit 11 or the camera control unit 111 sets the read start address of video image data to be read for output from the frame memory (not illustrated) of the video output unit 26 in the beginning line of the frame to be read next among the four frames of video image data that have already been recorded on the frame memory.

In step S107, the camera control unit 11 or the camera control unit 111 determines whether or not the value of the counter C for determining a codec unit 28 or a camera signal processing unit 25 or 126 from which data to be written in the frame memory (not illustrated) is acquired meets the condition C=0.

In a case where it is determined in step S107 that the condition C=0 holds, in step S108, the camera control unit 11 or the camera control unit 111 writes the video image data supplied from the #1 codec unit 28-1 or the #1 camera signal processing unit 25-1 or 126-1 in blocks, for example, for each line in the frame memory on the basis of the write address of the first frame that is the temporally earliest among the four frames, and the process proceeds to step S114.

In a case where it is determined in step S107 that the condition C=0 does not hold, in step S109, the camera control unit 11 or the camera control unit 111 determines whether or not the value of the counter C for determining a codec unit 28 or a camera signal processing unit 25 or 126 from which data to be written in the frame memory (not illustrated) is acquired meets the condition C=1.

In a case where it is determined in step S109 that the condition C=1 holds, in step S110, the camera control unit 11 or the camera control unit 111 writes the video image data supplied from the #2 codec unit 28-2 or the #2 camera signal processing unit 25-2 or 126-2 in blocks, for example, for each line in the frame memory on the basis of the write address of the second frame that is the temporally second earliest among the four frames, and the process proceeds to step S114.

In a case where it is determined in step S109 that the condition C=1 does not hold, in step S111, the camera control unit 11 or the camera control unit 111 determines whether or not the value of the counter C for determining a codec unit 28 or a camera signal processing unit 25 or 126 from which data to be written in the frame memory (not illustrated) is acquired meets the condition C=2.

In a case where it is determined in step S111 that the condition C=2 holds, in step S112, the camera control unit 11 or the camera control unit 111 writes the video image data supplied from the #3 codec unit 28-3 or the #3 camera signal processing unit 25-3 or 126-3 in blocks, for example, for each line in the frame memory on the basis of the write address of the third frame that is the temporally third earliest among the four frames, and the process proceeds to step S114.

In a case where it is determined in step S111 that the condition C=2 does not hold, the condition C=3 holds. Thus, in step S113, the camera control unit 11 or the camera control unit 111 writes the video image data supplied from the #4 codec unit 28-4 or the #4 camera signal processing unit 25-4 or 126-4 in blocks, for example, for each line in the frame memory (not illustrated) of the video output unit 26 on the basis of the write address of the fourth frame that is the temporally last among the four frames, and the process proceeds to step S114.

After the completion of the processing of step S108, S110, S112, or S113, in step S114, the camera control unit 11 or the camera control unit 111 increments the value of the counter C. Here, when the value of the counter C is 3, the counter C is initialized to 0.

In step S115, the camera control unit 11 or the camera control unit 111 determines whether or not the writing of the four frames whose write start addresses have been set in step S46 has been completed. In a case where it is determined in step S115 that the writing of the four frames has been completed, the process returns to step S104, and the subsequent processing is repeated.

In a case where it is determined in step S115 that the writing of the four frames has not been completed, in step S116, the camera control unit 11 or the camera control unit 111 increments the write address corresponding to the frame for which writing has been performed in the processing of step S108, S110, S112, or S113.

In step S117, the camera control unit 11 or the camera control unit 111 reads the imaging data recorded on the frame memory (not illustrated) of the video output unit 26 in blocks on the basis of the read address.

In step S118, the camera control unit 11 or the camera control unit 111 determines whether or not the reading of one frame has been completed. In a case where it is determined in step S118 that the reading of one frame has been completed, the process returns to step S106, and the subsequent processing is repeated.

In a case where it is determined in step S118 that the reading of one frame has not been completed, in step S119, the camera control unit 11 or the camera control unit 111 increments the read address.

In step S120, the camera control unit 11 or the camera control unit 111 determines whether or not completion of the video output has been commanded. In a case where it is determined in step S120 that completion of the video output has not been commanded, the process returns to step S107, and the subsequent processing is repeated. In a case where it is determined in step S120 that completion of the video output has been commanded, the process ends.

With such a process as above, video image data of a frame rate that is one quarter the imaging frame rate, which has been divided into four video image data segments, can be subjected to frame combination and output.

Note that, here, explanation has been given assuming that an image captured at 240 frames per second is divided into four pieces which are processed as moving image data of 60 frames per second and recorded, and frame combination is performed, as necessary, during reproduction and output. However, it goes without saying that any other frame rate of a captured image and any other number of segments may be used.

Specifically, for example, a moving image captured at 240 frames per second may be divided into two or three segments, or a moving image captured at 120 frames per second may be divided into two or three segments. Additionally, a moving image captured at 200 frames per second may be divided into four segments, or a moving image captured at 100 frames per second may be divided into two segments. Alternatively, a moving image captured at 96 frames per second may be divided into four segments, or a moving image captured at 48 frames per second may be divided into two segments.

At this time, when moving image data segments of each channel have a frame rate that is generally widely used for capturing a moving image, such as, for example, 60 frames per second, 50 frames per second, or 24 frames per second, for example, a general-purpose product can be used for a circuit or the like necessary for signal processing or codec, and cost can be reduced.

Additionally, here, explanation has been given of a case where, by way of example, the frame rates of segments of each channel are equal to each other. However, it goes without saying that segments of each channel may have different frame rates.

Furthermore, in the foregoing explanation, explanation has been given of a case where an image of HD resolution is captured. However, it goes without saying that the present invention can also be applied in a case where images of different resolutions are captured or in a case where an image is displayed in an interlaced format.

That is, an imaging apparatus to which the present invention is applied includes a solid-state imaging element capable of capturing an image at a frame rate that is N times a frame rate generally widely used for capturing a moving image, and can divide the image into N segments in units of frames to generate N channels of moving image data of a frame rate that is 1/N the imaging frame rate. The respective channels of moving image data can be processed and recorded in parallel using N parallel processing circuits. Then, an imaging apparatus to which the present invention is applied is capable of processing an imaging signal of a high resolution and a high frame rate or recording the imaging signal for a long time without performing complex processing.

Furthermore, in an imaging apparatus to which the present invention is applied, moving image data that is recorded in parallel is moving image data of a frame rate that is 1/N the imaging frame rate, that is, of a normal frame rate generally widely used for capturing a moving image. Moving image of the normal frame rate can be reproduced by reproducing one channel alone, moving image of a frame rate that is twice the normal frame rate can be reproduced by reproducing two channels, and an image of a frame rate that is N time the normal frame rate can be reproduced by reproducing N channels.

Additionally, in the present invention, in order to execute processes in parallel, additionally, in order to record an image of a high resolution and a high frame rate for a long time, imaging data is divided in minimum units of frames without dividing each frame of the imaging data into a plurality of pieces, for example, for every slice or within a predetermined rectangular range. This allows the generated moving image data segments of each channel to be reproduced and displayed alone. Further, the number of frames to be combined is changed so as to facilitate easy reproduction and output at different frame rates. Additionally, in a case where a moving image recorded at a frame rate lower than the frame rate of imaging data is reproduced, there may be no need to perform codec for a channel that is not displayed.

By doing so, an imaging apparatus capable of recording an image of a high resolution and a high frame rate for a long time and capable of outputting reproduction data of a plurality of frame rates by rearranging frames, as necessary, using recorded moving image data segments without performing complex processing can be provided.

Figure 15:
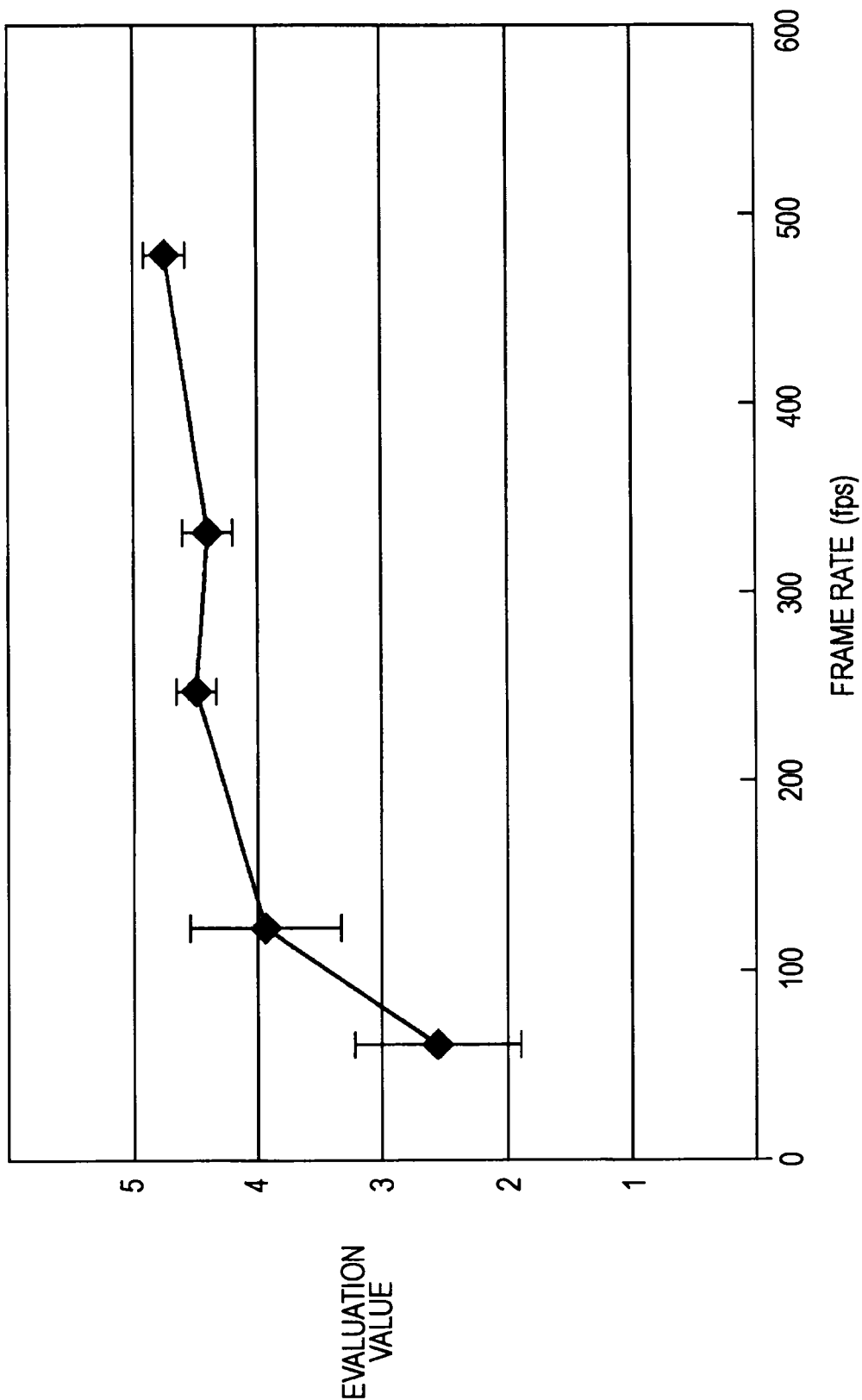
FIG. 15 is a diagram illustrating an example of the relationship between the frame rate of a movie and the evaluation value in a case where image quality was evaluated using five levels.

Note that in a case where a moving image is displayed, in accordance with an increase of the frame rate or field rate, the evaluation value of jerkiness or motion blur, which is given by an observer who views a displayed image, is improved. FIG. 15 illustrates an example of the relationship between the frame rate of a movie and the evaluation value in a case where image quality was evaluated using five levels as controls for a plurality of users.

An evaluation of 4 or more out of five-level evaluation can be achieved on average for both jerkiness and motion blur at around 150 frames per second, with the tendency that the evaluation value increases up to near 250 frames per second, whereas the evaluation value does not increase so much at a higher frame rate or field rate (see, for example, Japanese Unexamined Patent Application Publication No. 2004-266808).

Many video resources that are presently widely used are of 50 frames per second or 60 frames per second. Thus, an ideal frequency that takes the efficiency of video resources into consideration is a frequency that is an integer multiple of 50 or 60 frames per second, namely, 240 frames per second or 200 frames per second. When the output field rate has any of the above values, an observer who views a displayed image does not observe flicker or perceives substantially no jerkiness or motion blur, which is preferable. Additionally, since many video resources that are presently widely used are of 50 frames per second or 60 frames per second, when segments have a frame rate of 50 frames per second or 60 frames per second, a general-purpose product can be used for a circuit that performs signal processing or codec, and cost can be reduced.

The series of processes described above can be executed by hardware or software. This software is installed from a recording medium into a computer in which a program constituting this software is incorporated in dedicated hardware or, for example, a general-purpose personal computer or the like that is capable of executing various functions by installing therein various programs. In this case, the processes described above are executed by a personal computer 500 as illustrated in FIG. 16.

Figure 16:
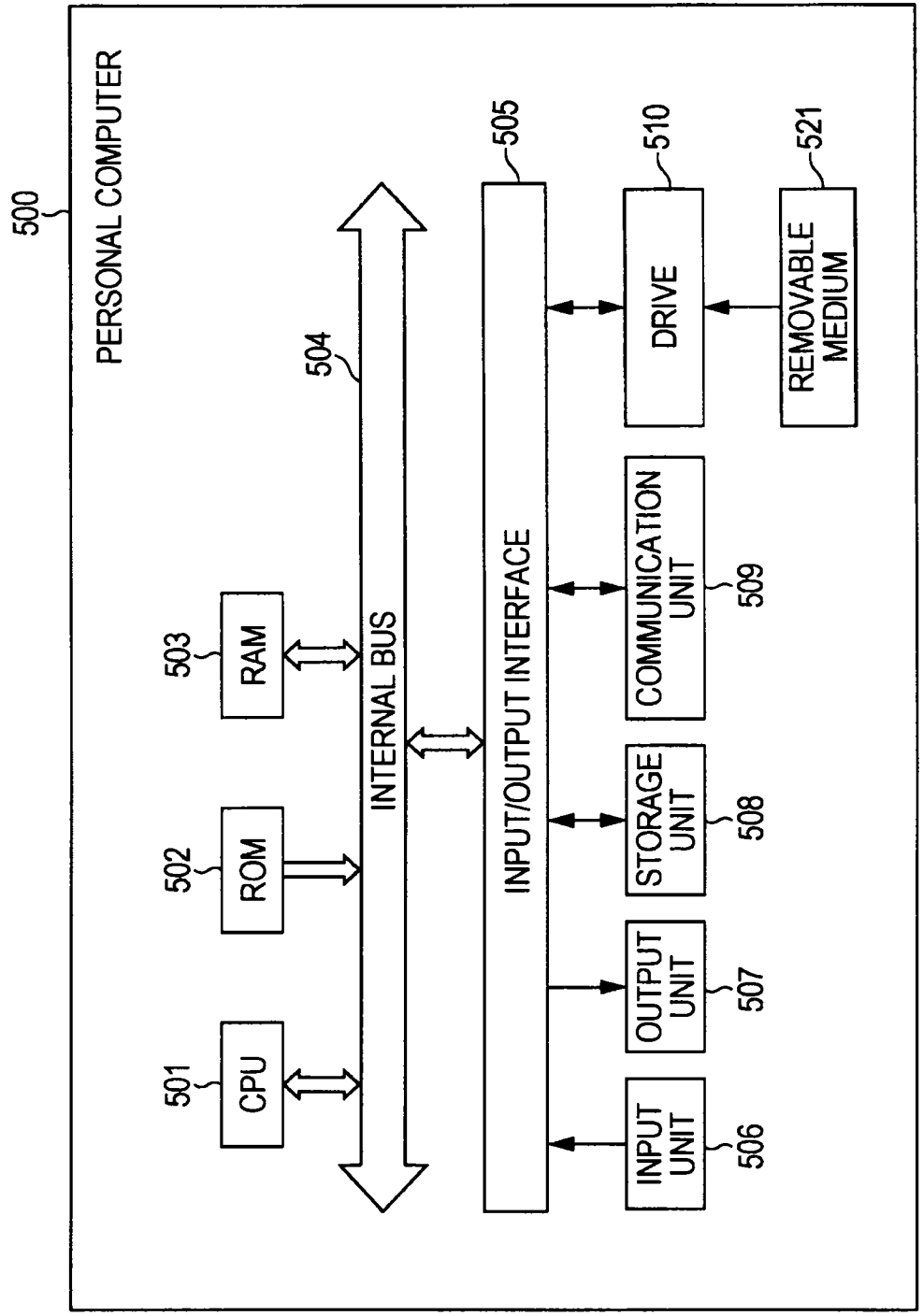
FIG. 16 is a block diagram illustrating a configuration of a personal computer.

In FIG. 16, a CPU (Central Processing Unit) 501 executes various processes in accordance with a program stored in a ROM (Read Only Memory) 502 or a program loaded from a storage unit 508 to a RAM (Random Access Memory) 503. The RAM 503 further stores, as appropriate, data and the like necessary for the CPU 501 to execute various processes.

The CPU 501, the ROM 502, and the RAM 503 are connected to one another via an internal bus 504. An input/output interface 505 is also connected to this internal bus 504.

The input/output interface 505 is connected to an input unit 506 composed of a keyboard, a mouse, and the like, an output unit 507 composed of a display composed of a CRT, an LCD, or the like, a speaker, and the like, the storage unit 508 configured by a hard disk and the like, and a communication unit 509 configured by a modem, a terminal adapter, or the like. The communication unit 509 performs communication processing via various networks including a telephone line and a CATV.

The input/output interface 505 is also connected to a drive 510, as necessary, in which a removable medium 521 composed of a magnetic disk, an optical disk, a magneto-optical disk, a semiconductor memory, or the like is placed, as appropriate. A computer program read therefrom is installed into the storage unit 508, as necessary.

In a case where the series of processes is executed by software, a program that constitutes this software is installed from a network or a recording medium.

This recording medium is not only configured by, as illustrated in FIG. 16, a package medium composed of the removable medium 521 having the program recorded thereon, which is distributed separately from the computer in order to provide the program to a user, but is also configured by the ROM 502, a hard disk including the storage unit 508, or the like on which the program is recorded, which is provided to a user in a state of being incorporated in advance in the main body of an apparatus.

Note that in a case where the series of processes described above is executed by software, signal processing and codec may be executed by the CPU 501, or hardware components that perform signal processing and codec may be prepared and the CPU 501 may execute a program for controlling those hardware components (executing control basically similar to the control executed by the camera control unit 11 or the camera control unit 111).

Note that in this specification, steps describing a computer program are designed to include, as well as processes performed in times series in accordance with the order described herein, processes executed in parallel or individually even through they are not necessarily processed in time series.

Note that embodiments of the present invention are not limited to the embodiment described above, and a variety of modifications can be made without departing from the scope of the present invention.

The invention claimed is:

1. An imaging apparatus comprising:
   an imaging unit configured to obtain imaging data of a first rate;
   a data dividing unit configured to distribute the imaging data of the first rate, which is captured by the imaging unit, in unit of frames and dividing the imaging data into N channels of moving image data of a second rate that is a rate that is 1/N the first rate (where N is a positive integer greater than one); and N image processing units each implemented by processing circuitry and configured to process concurrently and in parallel the N channels of moving image data obtained by the data dividing unit, the processing of each of the N channels including color space conversion processing converting a color space of the moving image data.

2. The imaging apparatus according to claim 1, wherein the color space conversion processing further converts the color space of the moving image data from a color space defined by RGB into a color space defined by luminance and chrominance.

3. The imaging apparatus according to claim 1, further comprising:

an output unit configured to output the N channels of moving image data processed by the image processing unit, wherein the output unit outputs only one channel of the N channels of moving image data or outputs a result obtained by performing frame combination on at least a portion of the N channels of moving image data on the basis of a rate of moving image data to be output.

4. The imaging apparatus according to claim 1, further comprising:

a recording unit configured to record the N channels of moving image data processed by the image processing unit, wherein the recording unit is further configured such that N recording units are provided or the recording unit is divided into N areas, and respectively records the N channels of moving image data processed by the image processing unit.

5. The imaging apparatus according to claim 1, wherein the second rate is 60 frames per second.

6. The imaging apparatus according to claim 1, wherein the second rate is 50 frames per second.

7. The imaging apparatus according to claim 1, wherein the second rate is 24 frames per second.

8. The imaging apparatus according to claim 1, wherein the N channels are four channels.

9. The imaging apparatus according to claim 1, wherein the N channels are two channels.

10. The imaging apparatus according to claim 1, wherein the first rate is 240 frames per second.

11. The imaging apparatus according to claim 1, further comprising:

a recording unit configured to record the N channels of moving image data processed by the image processing unit, wherein the recording unit is further configured such that N recording units are provided or the recording unit is divided into N areas, and respectively records the N channels of moving image data processed by the image processing unit.

12. The imaging apparatus according to claim 1, further comprising:

a recording unit configured to record the N channels of moving image data processed by the image processing unit; and an encoding unit configured to encode the N channels of moving image data processed by the image processing unit, wherein the recording unit records the N channels of moving image data encoded by the encoding unit.

13. The imaging apparatus according to claim 12, further comprising:

a decoding unit configured to decode the N channels of moving image data encoded by the encoding unit and recorded by the recording unit; and an output unit configured to output the N channels of moving image data decoded by the decoding unit, wherein the decoding unit decodes only one channel of the N channels of moving image data or decodes at least a portion of the N channels of moving image data on the basis of a rate of moving image data to be output, and the output unit outputs the one channel of the N channels of moving image data, which is decoded by the decoding unit, or outputs a result obtained by performing frame combination on at least a portion of the N channels of moving image data on the basis of a rate of moving image data to be output.

14. An imaging method for a portable imaging apparatus that captures moving image data, the imaging method comprising the steps of:

performing, at the portable imaging apparatus, imaging at a first rate;

dividing, at the portable imaging apparatus, captured imaging data of the first rate in units of frames into N channels of moving image data of a second rate that is a rate that is 1/N the first rate (where N is a positive integer greater than one); and concurrently processing the obtained N channels of moving image data using N parallel units by processing the N channels of moving image data, the processing of each of the N channels including color space conversion processing converting a color space of the moving image data.

15. A non-transitory computer readable medium having stored thereon a program for causing a computer to execute a process of capturing moving image data, the program causing the computer to execute a process comprising the steps of:

controlling a portable imaging apparatus to perform imaging at a first rate;

dividing, at the portable imaging apparatus, captured imaging data of the first rate in units of frames into N channels of moving image data of a second rate that is a rate that is 1/N the first rate (where N is a positive integer greater than one); and concurrently processing, at the portable imaging apparatus, the obtained N channels of moving image data using N parallel units by processing the N channels of moving image data, the processing of each of the N channels including color space conversion processing converting a color space of the moving image data.

16. An imaging apparatus comprising:

an imaging unit configured to obtain imaging data of a first rate;

a data dividing unit configured to distribute the imaging data of the first rate, which is captured by the imaging unit, in units of frames and dividing the imaging data into N channels of moving image data of a second rate that is a rate that is 1/N the first rate (where N is a positive integer greater than one); and N image processing units each implemented by processing circuitry and configured to process in parallel the N channels of moving image data obtained by the data dividing unit, wherein the second rate is 24, 50, or 60 frames per second.

17. An imaging apparatus comprising:

an imaging unit configured obtain imaging data of a first rate;

a data dividing unit configured to distribute the imaging data of the first rate, which is captured by the imaging unit, in units of frames and dividing the imaging data into N channels of moving image data of a second rate that is a rate that is 1/N the first rate (where N is a positive integer greater than one); and N image processing units each implemented by processing circuitry and configured to process in parallel the N channels of moving image data obtained by the data dividing unit, wherein the N channels are four channels.

18. An imaging apparatus comprising:

an imaging unit configured to obtain imaging data of a first rate;

a data dividing unit configured to distribute the imaging data of the first rate, which is captured by the imaging unit, in units of frames and dividing the imaging data into N channels of moving image data of a second rate that is a rate that is 1/N the first rate (where N is a positive integer greater than one); and N image processing units each implemented by processing circuitry and configured to process in parallel the N channels of moving image data obtained by the data dividing unit, wherein the first rate is 240 frames per second.

19. The imaging apparatus according to claim 11, wherein the image processing unit includes at least one of a white balance correction unit, an RGB interpolation synchronization processing unit, a matrix processing unit, a gamma correction unit, and a color space conversion unit.

20. The imaging apparatus according to claim 2, wherein the color conversion processing converts pixel data based on an RGB color space into pixel data based on a YCbCr color space.

21. The imaging apparatus according to claim 16, wherein the processing of each of the N channels includes color space conversion processing converting a color space of the moving image data.

22. The imaging apparatus according to claim 17, wherein the processing of each of the N channels includes color space conversion processing converting a color space of the moving image data.

23. The imaging apparatus according to claim 18, wherein the processing of each of the N channels includes color space conversion processing converting a color space of the moving image data.

* * * * *